United States Patent [19]

Heller et al.

[11] 4,077,038
[45] Feb. 28, 1978

[54] DIGITAL RADAR CONTROL SYSTEM AND METHOD

[75] Inventors: Robert I. Heller, Baltimore; Larry C. Schafer, Linthicum, both of Md.; Stephen R. McCracken, Wichita, Kans.

[73] Assignee: Westinghouse Electric Corporation, Pittsburgh, Pa.

[21] Appl. No.: 672,891

[22] Filed: Apr. 1, 1976

[51] Int. Cl.² .............................................. G01S 7/44
[52] U.S. Cl. .................................. 343/7 A; 343/5 DP
[58] Field of Search ........................... 343/5 DP, 7 A

[56] References Cited

U.S. PATENT DOCUMENTS

| | | | |
|---|---|---|---|
| 3,646,554 | 2/1972 | Fierston et al. | 343/5 DP |
| 3,720,942 | 3/1973 | Wilmot et al. | 343/7 A X |
| 3,858,208 | 12/1974 | Parke et al. | 343/5 DP X |
| 3,987,442 | 10/1976 | McLeod, Jr. | 343/5 DP X |

Primary Examiner—T.H. Tubbesing
Attorney, Agent, or Firm—H. W. Patterson

[57] ABSTRACT

A digital system for processing return energy in a aircraft pulsed doppler radar system which includes a wave energy transmitter and a receiver for detecting the wave energy returned to the receiver by reflection. A digital signal processor develops target and noise information from the return energy and the return energy related information is supplied to a digital computer. The computer determines the range from which the return energy is reflected and provides digital range data. The width of the return energy in the time domain and the amplitude of the return energy are evaluated to provide digital width and digital amplitude data. The return energy is designated as clutter and clutter AGC and blanking signals are generated to control the receiver in response to an evaluated width and amplitude of the return energy above predetermined minimum values. The return energy is designated as an altitude line and the altitude line designated return energy is tracked in response to a predetermined number of detections of the return energy at about the same range over a predetermined period of time. The altitude line designating and tracking loop has a tracking loop response sufficient to account for changes in terrain beneath the aircraft and for sudden range changes of short duration so that the altitude line is not lost due to changes in the terrain beneath the aircraft. The return energy is designated as a target and the target designated return energy is tracked in response to the range determination, the amplitude determination and an evaluated width of the return energy below the predetermined value.

18 Claims, 30 Drawing Figures

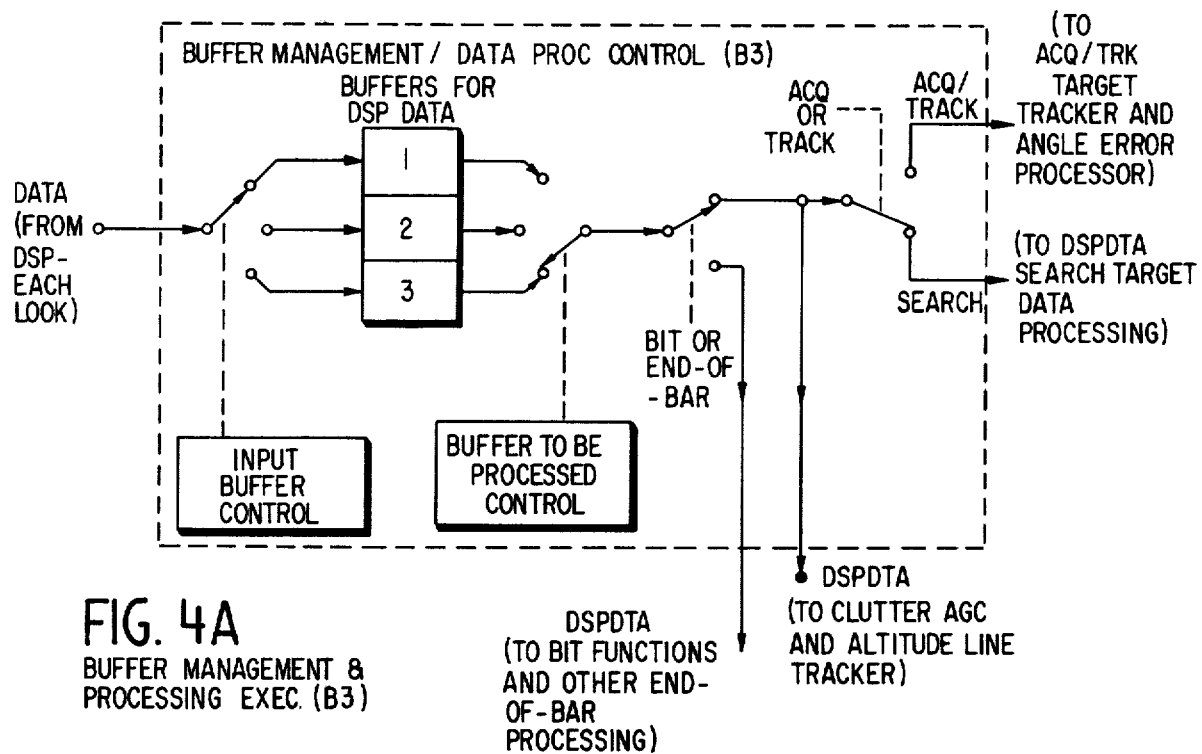
FIG. 4A BUFFER MANAGEMENT & PROCESSING EXEC. (B3)
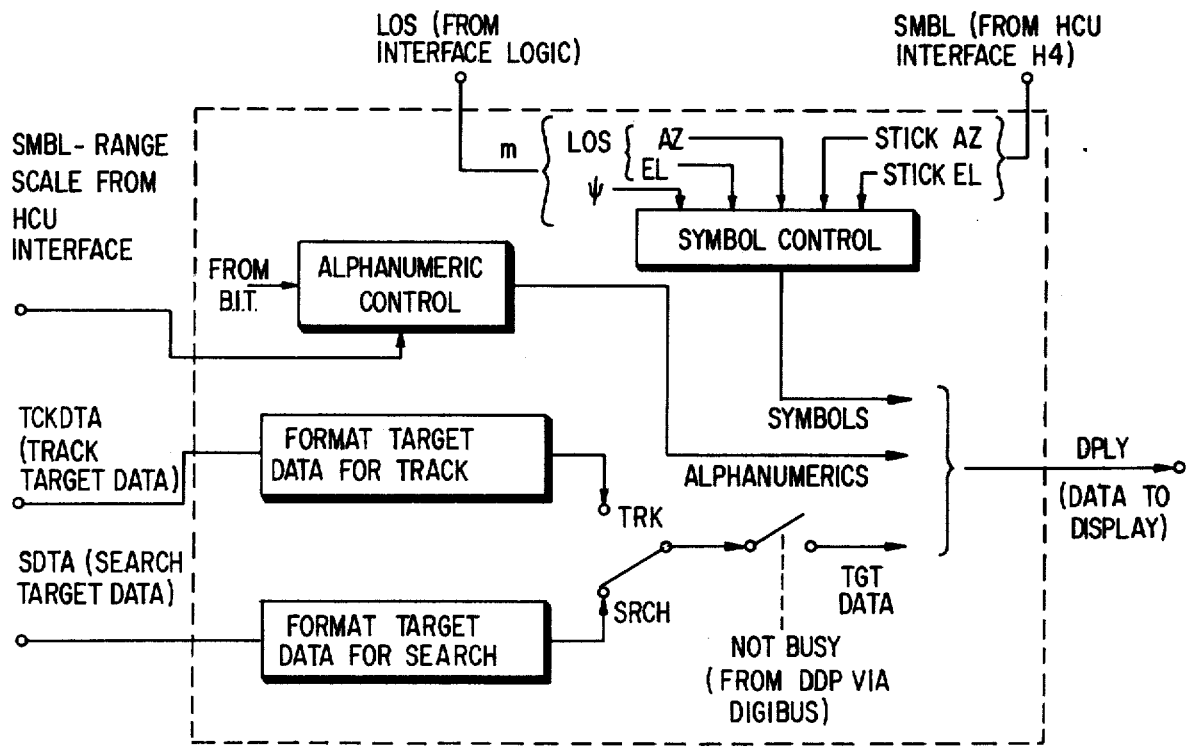
FIG. 13 TARGET & ANTENNA LOS DATA FORMATTER & REPORTER (D5)

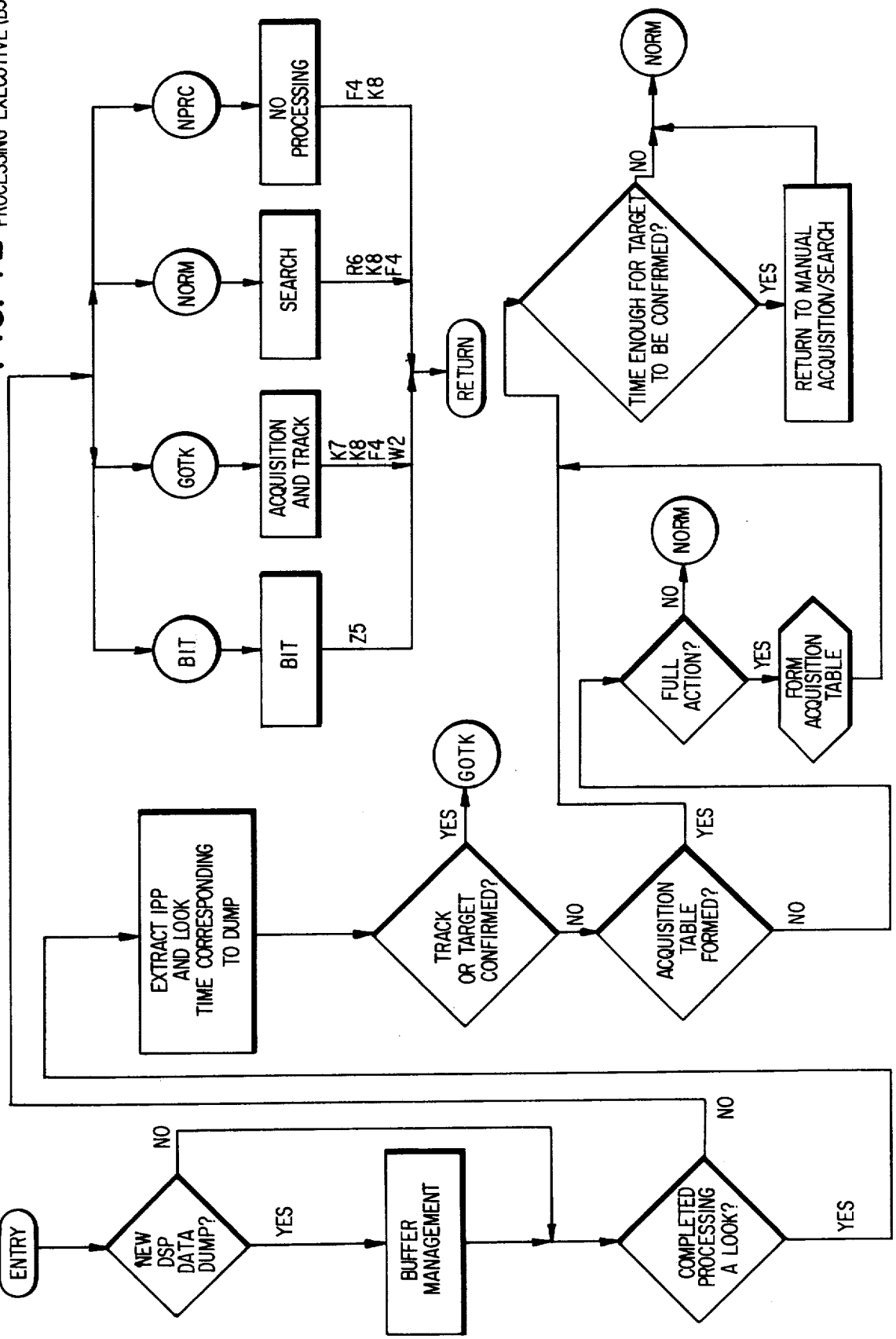
FIG. 4B BUFFER MANAGEMENT & PROCESSING EXECUTIVE (B3)

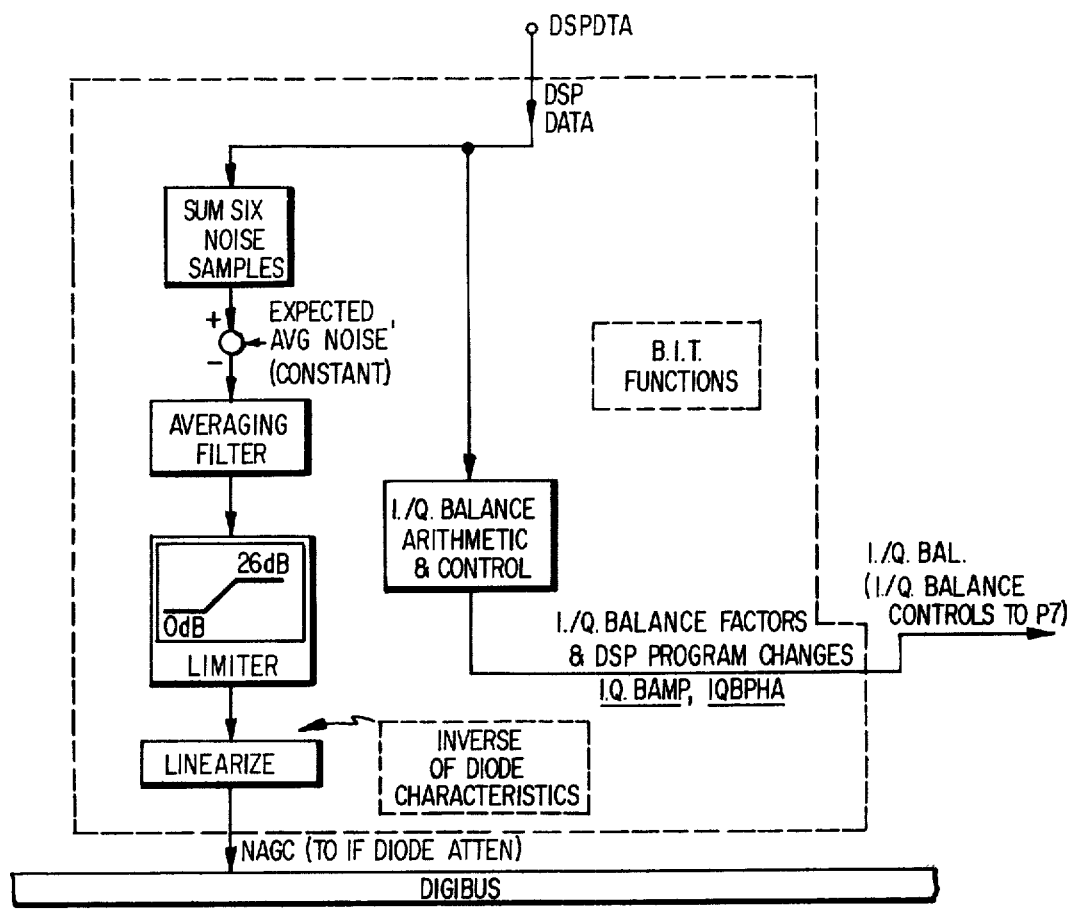
FIG. 5A  NOISE AGC LEVEL CONTROL (Z5)
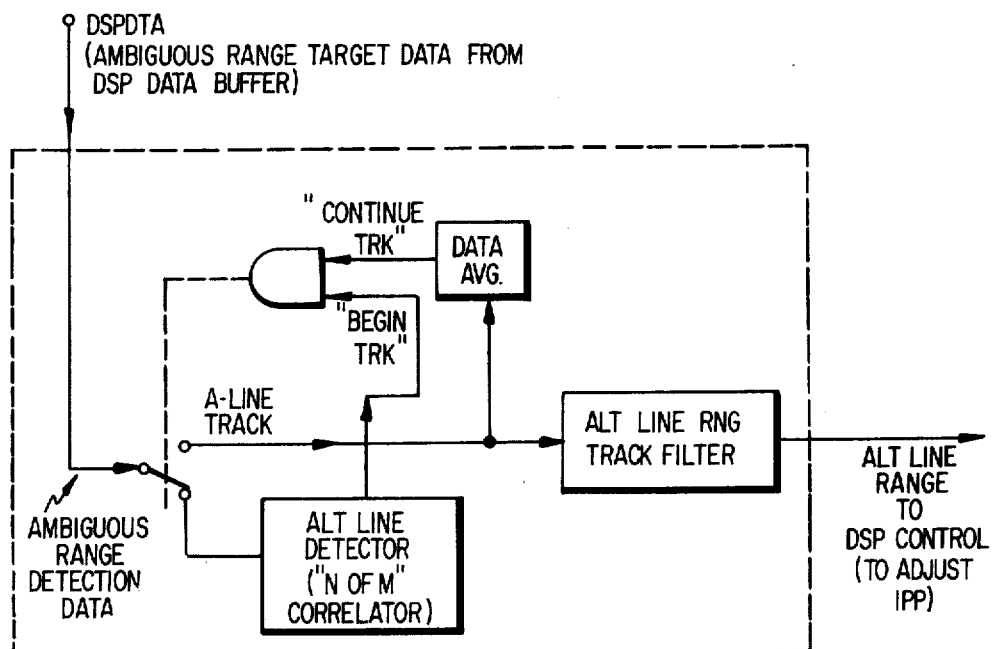
FIG. 7  ALTITUDE LINE TRACKER (K8)

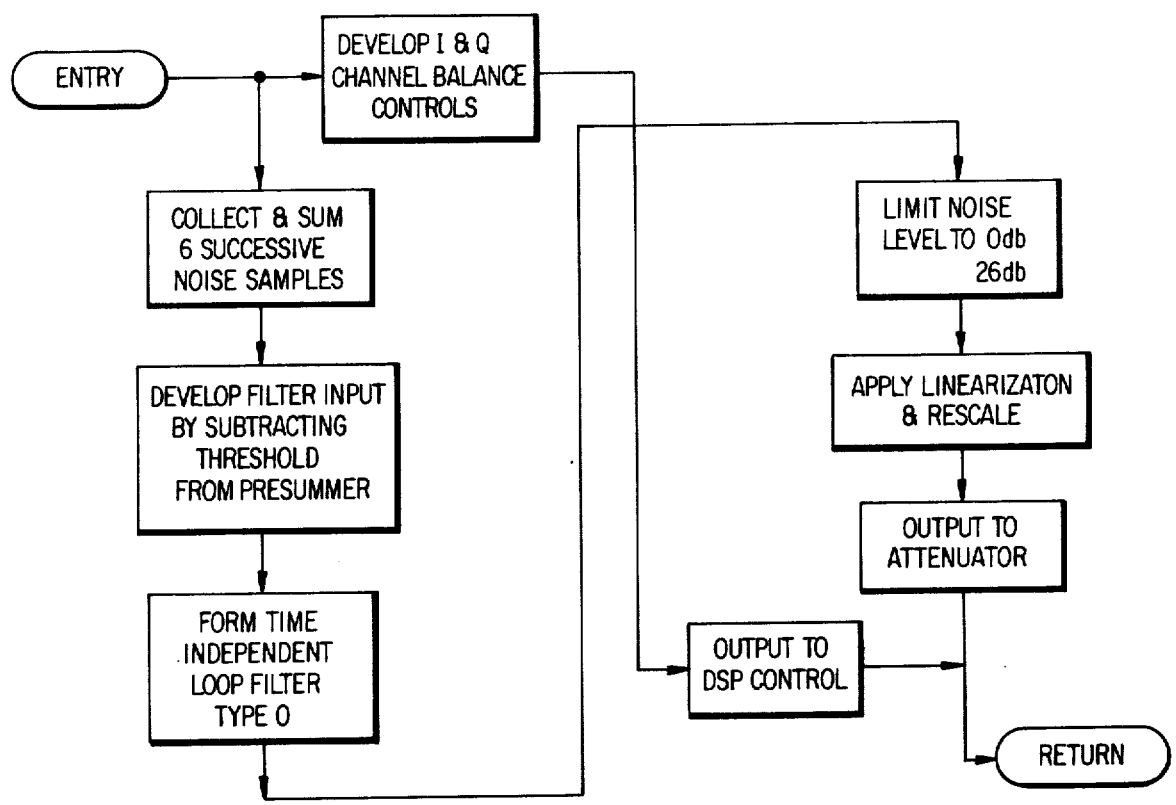
FIG. 5B NOISE AGC LEVEL CONTROL (Z5)
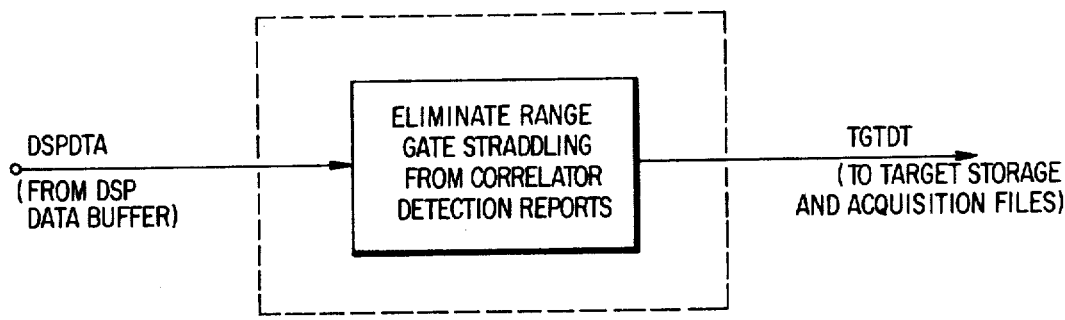
FIG. 6A SEARCH CORRELATOR TARGET OUTPUT PROCESSOR (R6)

SEARCH CORRELATOR (TARGET) OUTPUT PROCESSING

INPUT INTERFACE LOGIC ELEMENT

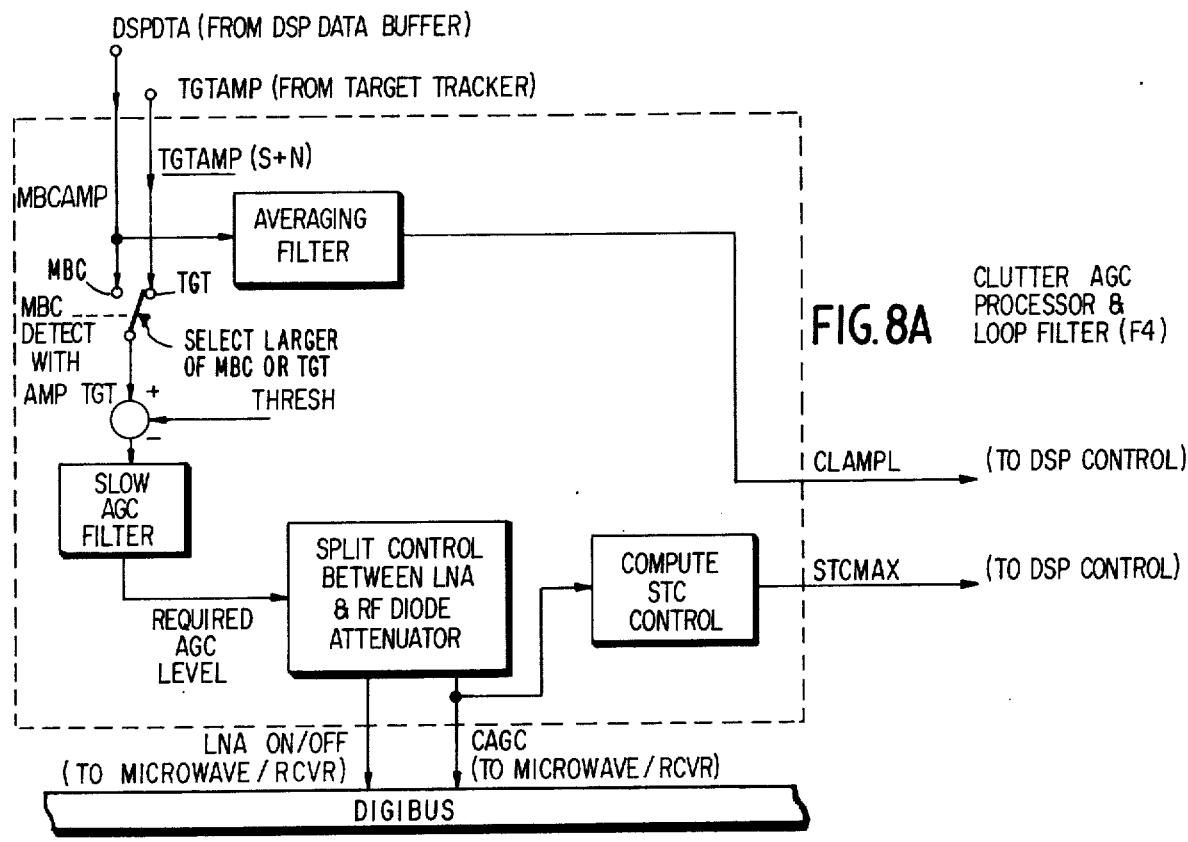
FIG. 8A CLUTTER AGC PROCESSOR & LOOP FILTER (F4)
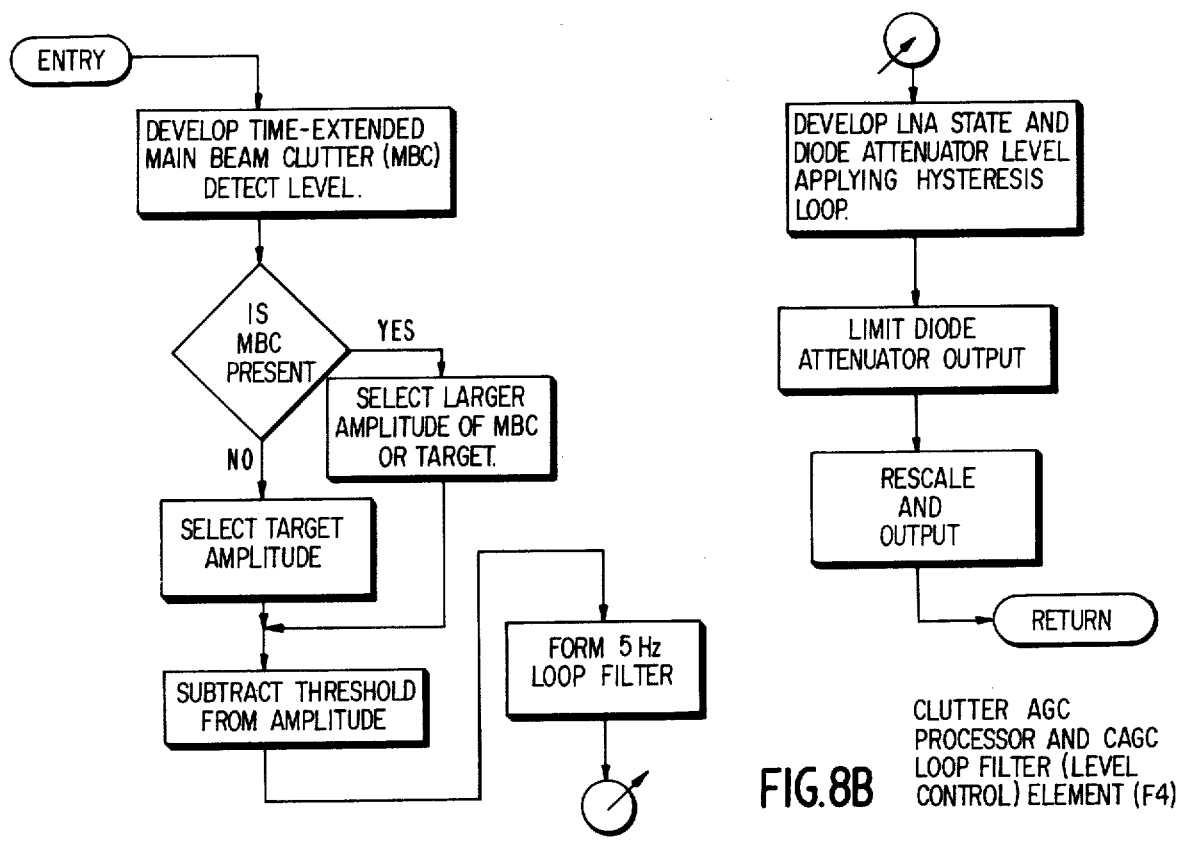
FIG. 8B CLUTTER AGC PROCESSOR AND CAGC LOOP FILTER (LEVEL CONTROL) ELEMENT (F4)

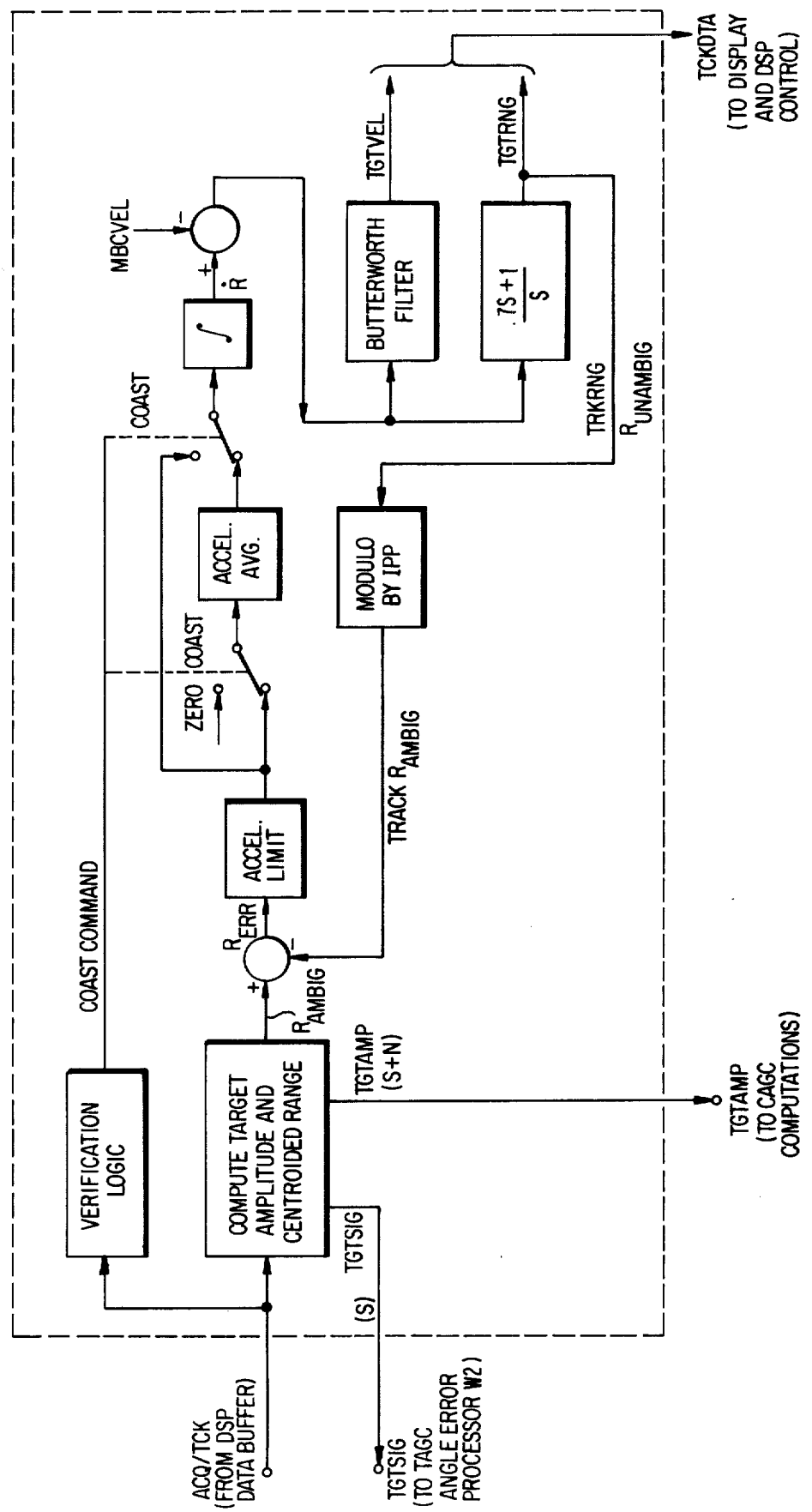
FIG. 9A TARGET TRACKER (K7)

TARGET TRACKER ELEMENT (K7)

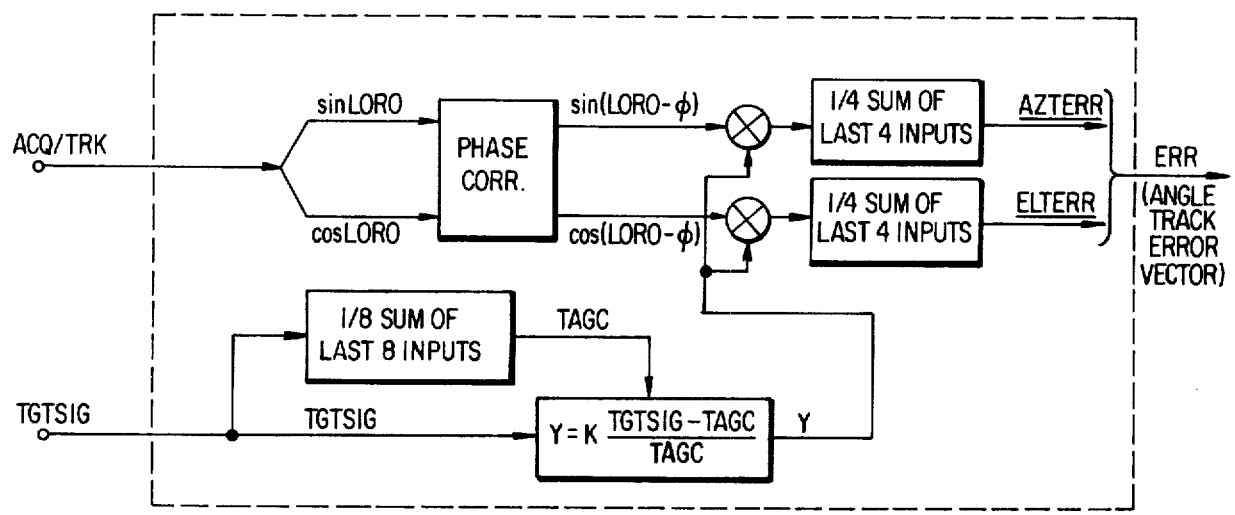
FIG.10A TARGET AGC LOOP FILTER & ANGLE ERROR PROCESSOR (W2)
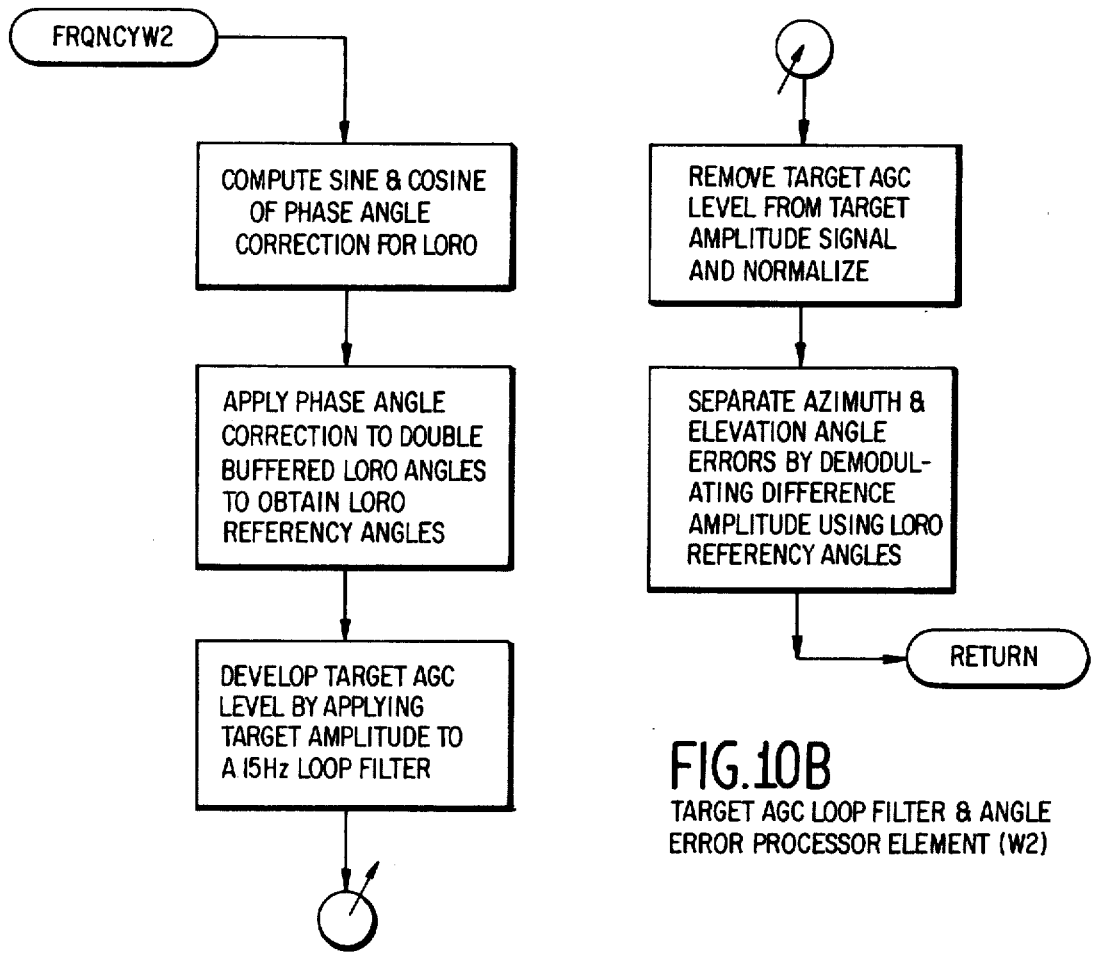
FIG.10B TARGET AGC LOOP FILTER & ANGLE ERROR PROCESSOR ELEMENT (W2)

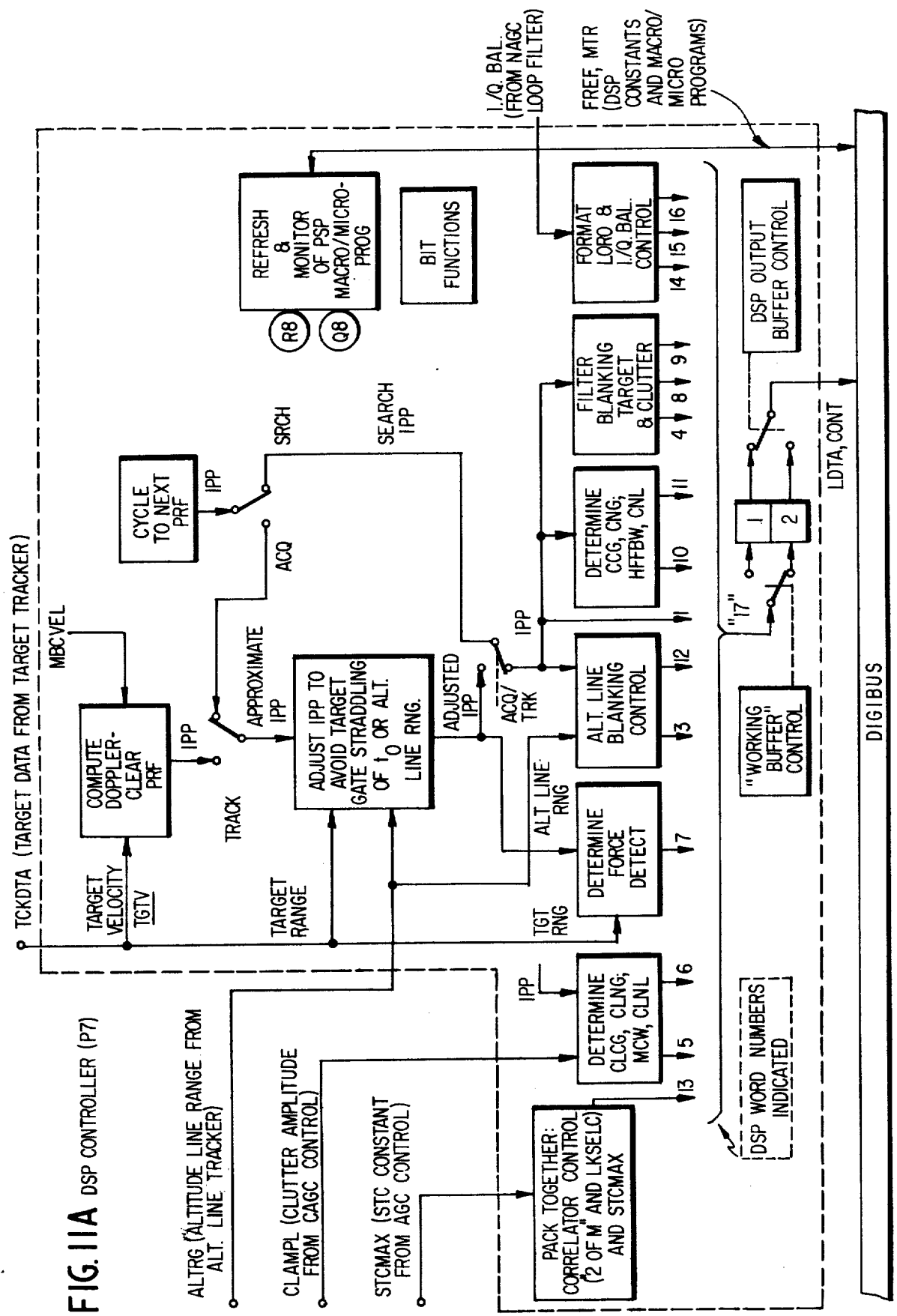
FIG.11A DSP CONTROLLER (P7)

DSP CONTROLLER ELEMENT (P7)

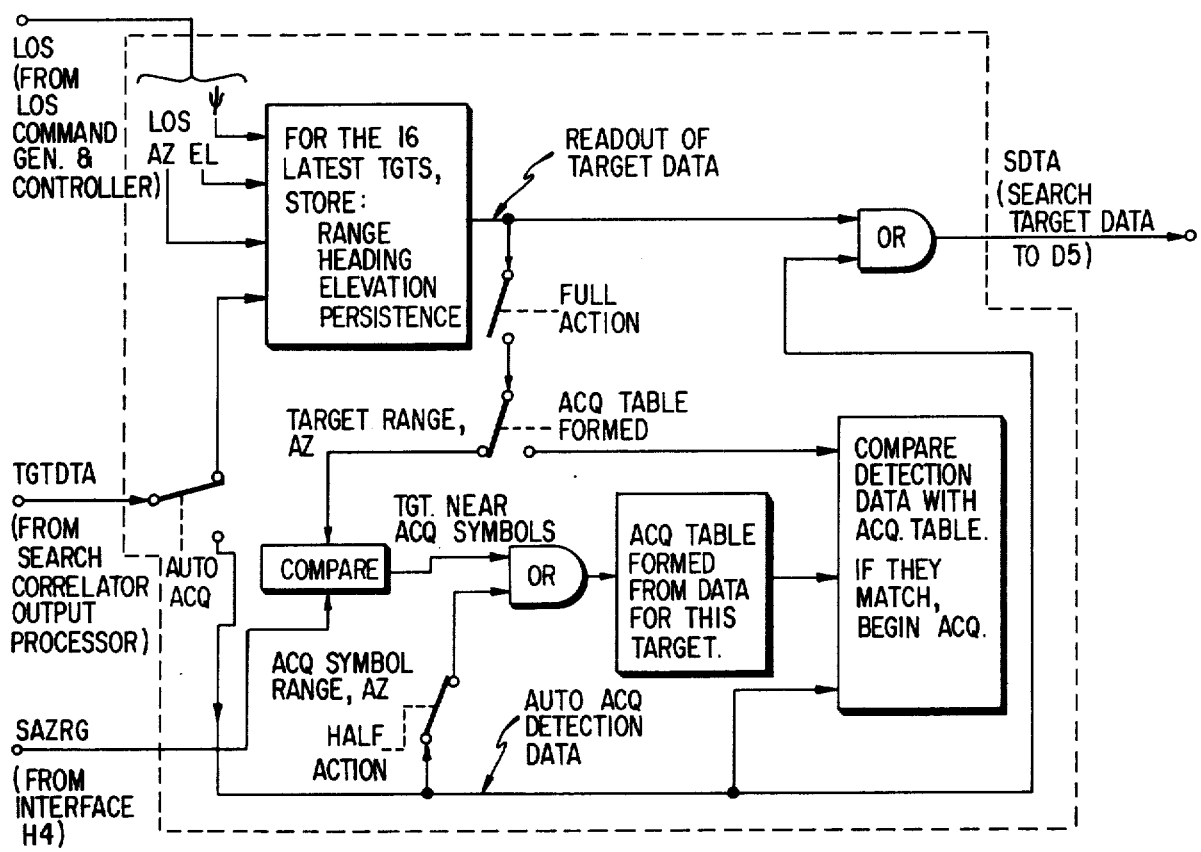
FIG. 12 A  TARGET STORAGE & ACQUISITION FILES (T9)
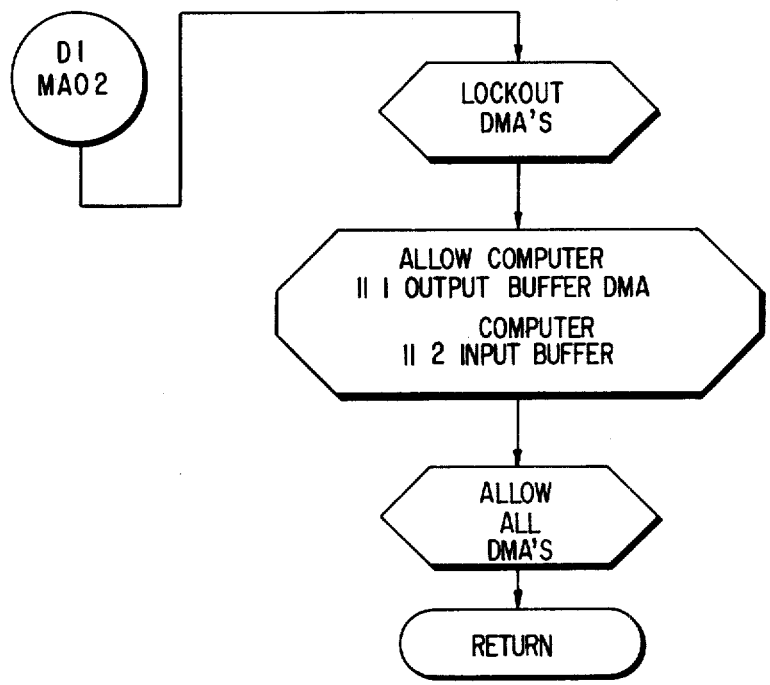
FIG. 15  DMA INTERFACE LOGIC ELEMENT (D1)

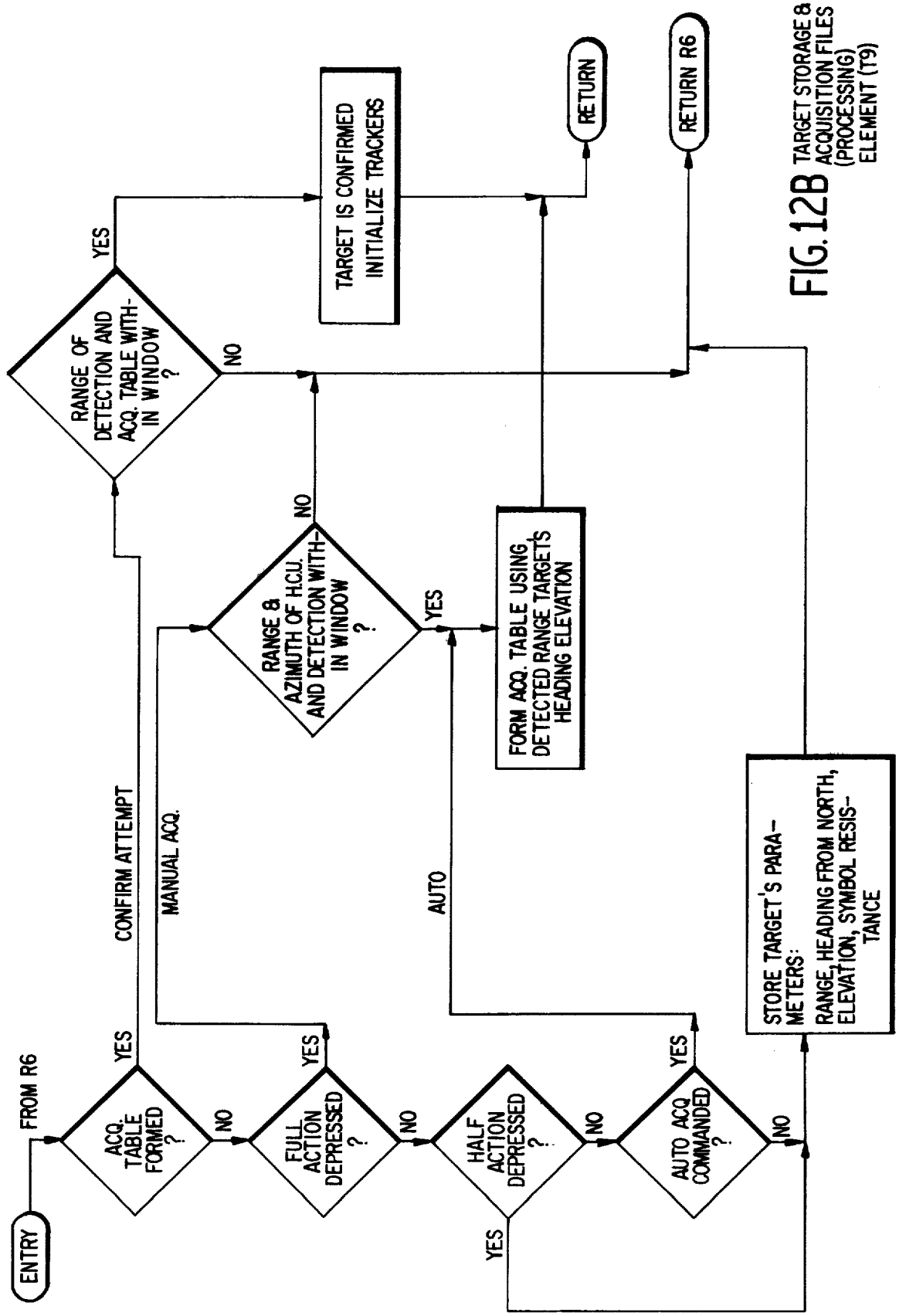
FIG.12B TARGET STORAGE & ACQUISITION FILES (PROCESSING) ELEMENT (T9)

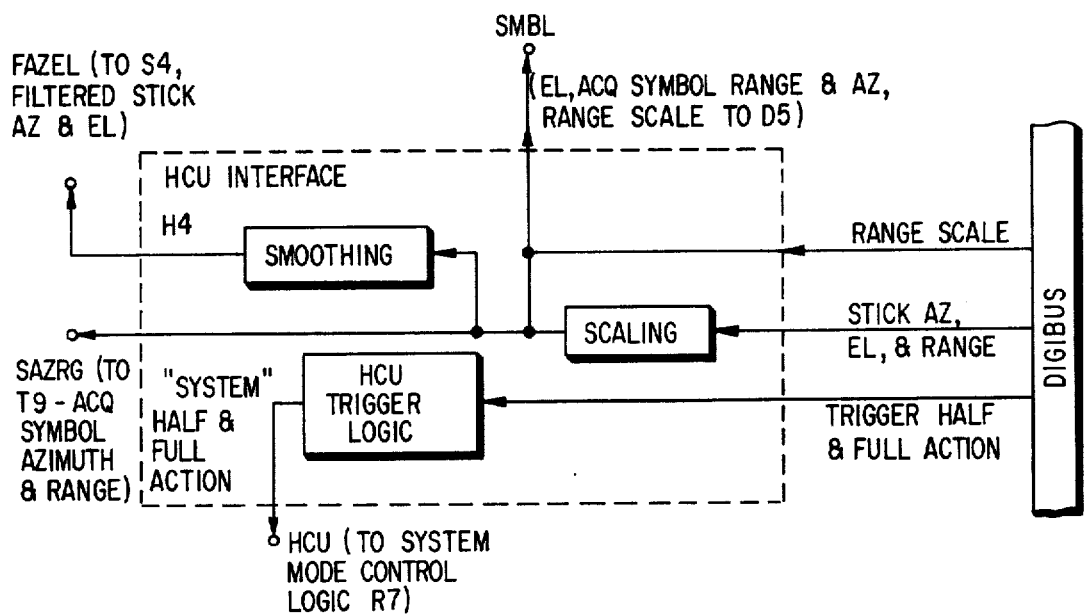
FIG. 16A  HCU INTERFACE LOGIC & CONTROL (H4)
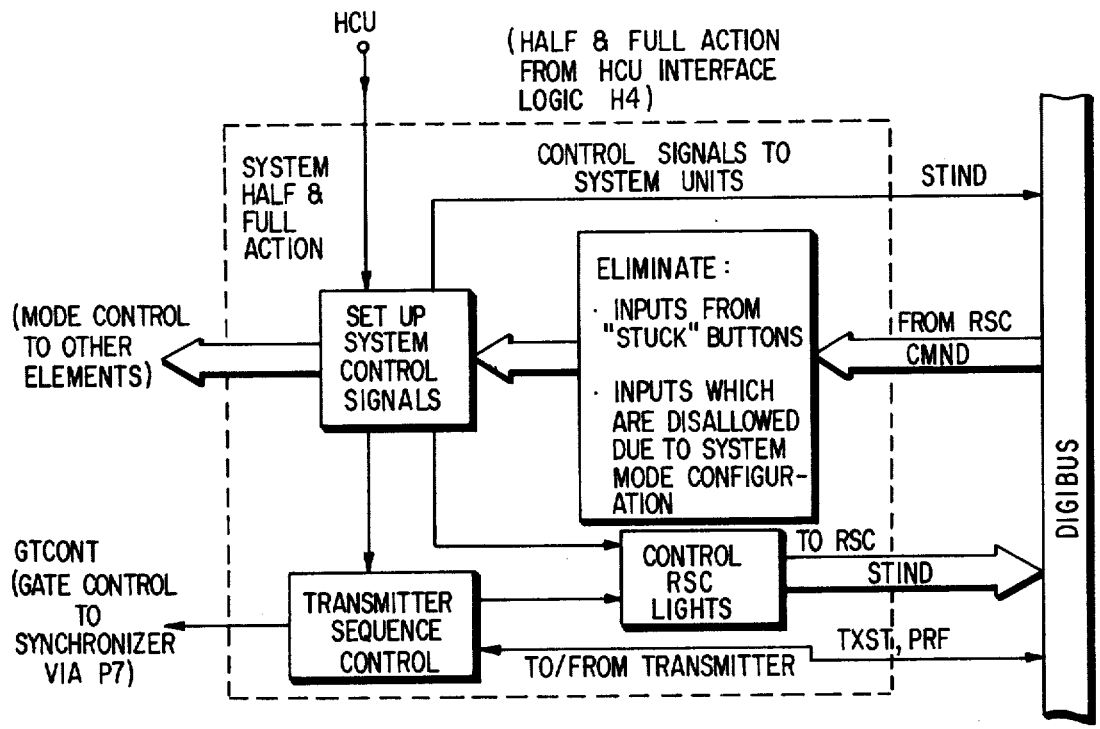
FIG. 17A  RSC INTERFACE & RADAR MODE CONTROL (R7)

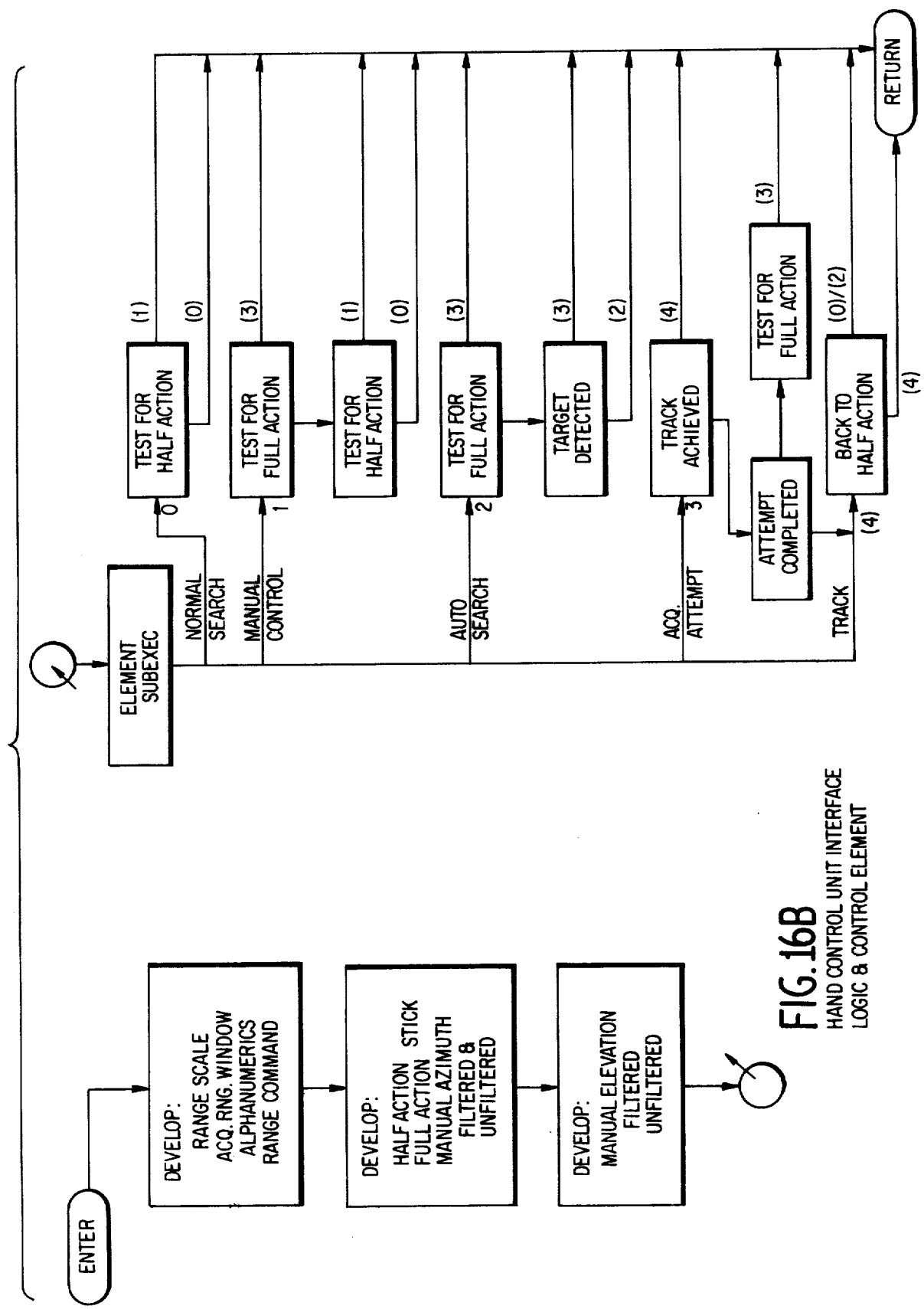
FIG.16B HAND CONTROL UNIT INTERFACE
LOGIC & CONTROL ELEMENT

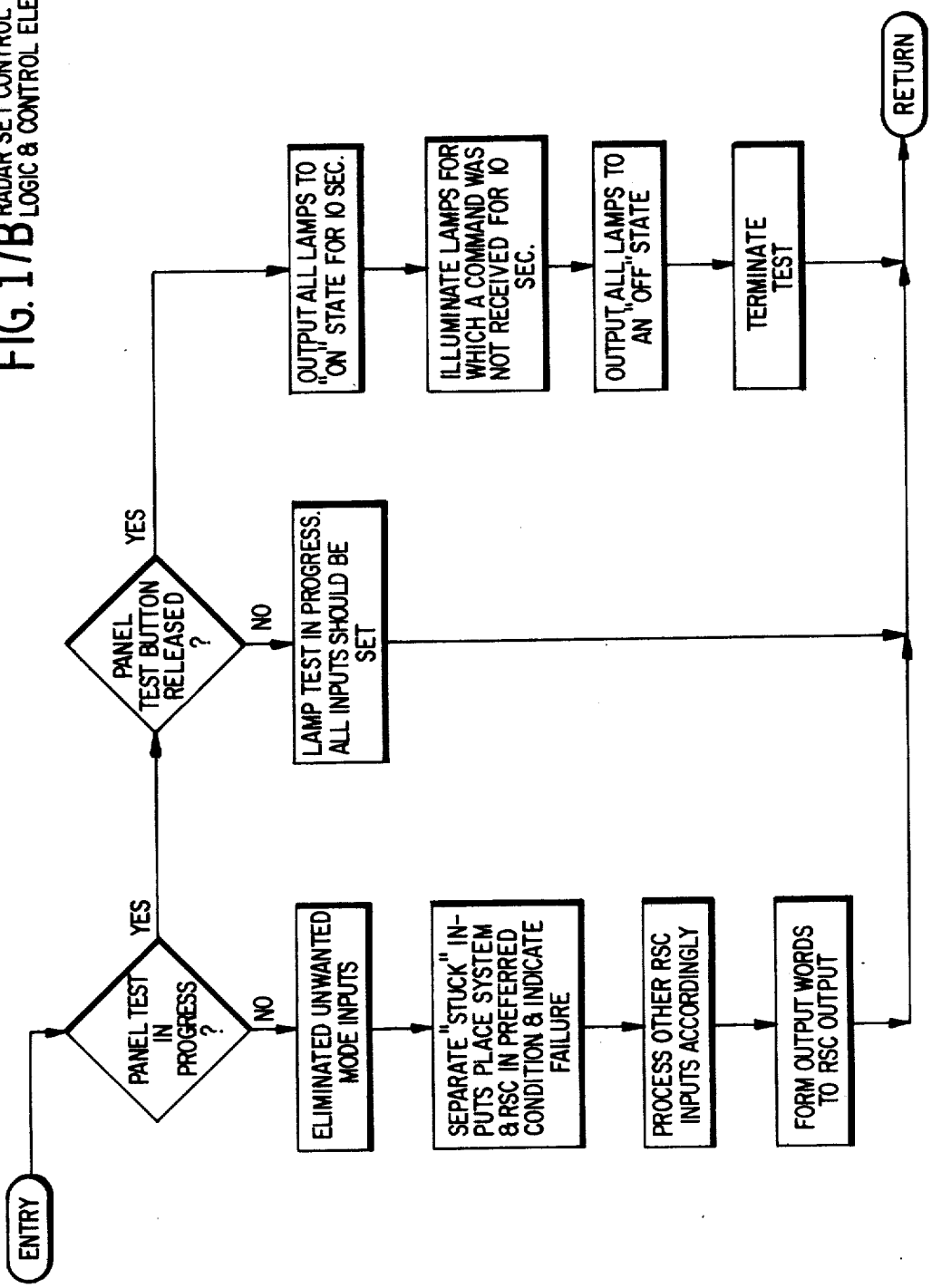

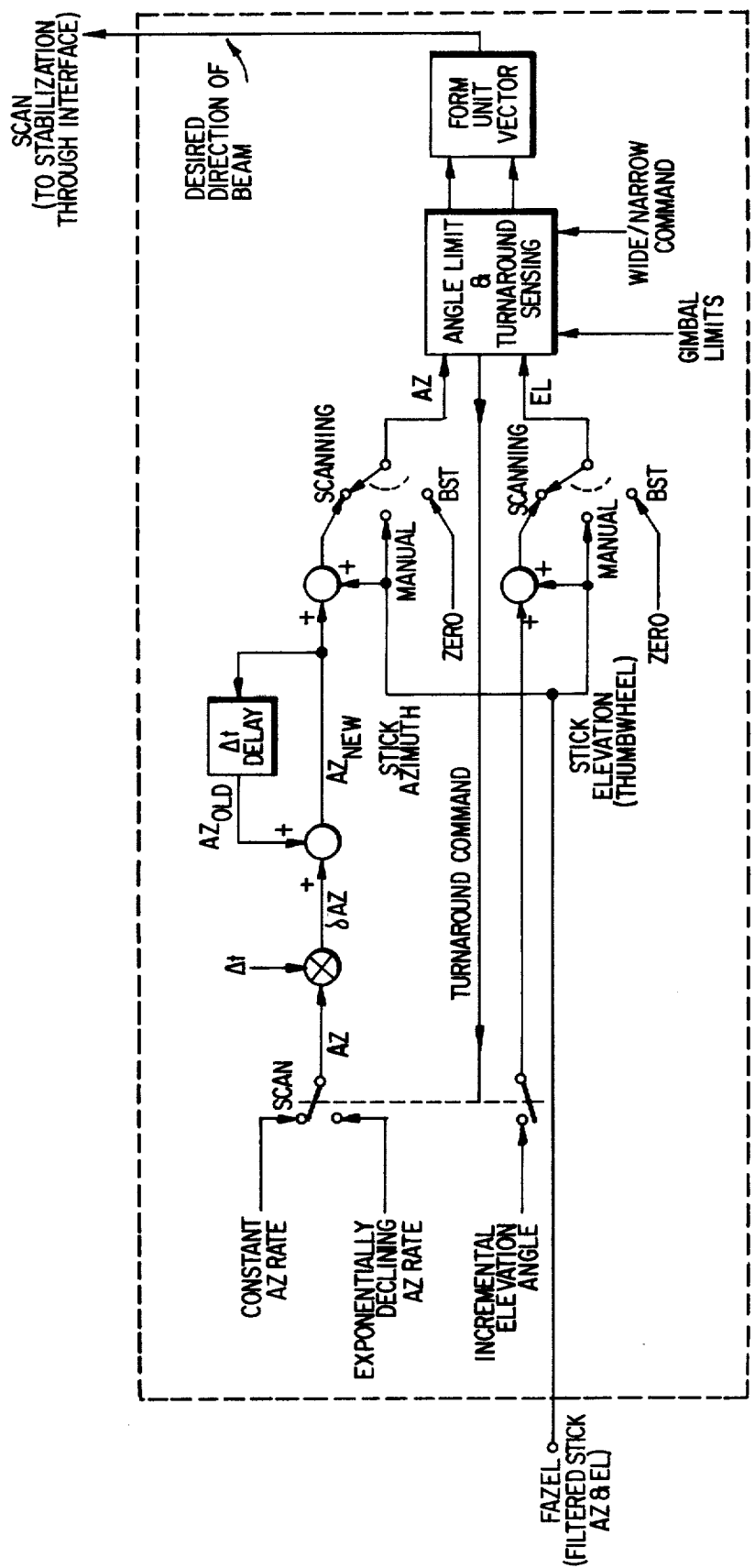
FIG. 18A LOS COMMAND GENERATOR & CONTROLLER-SCAN (S4)

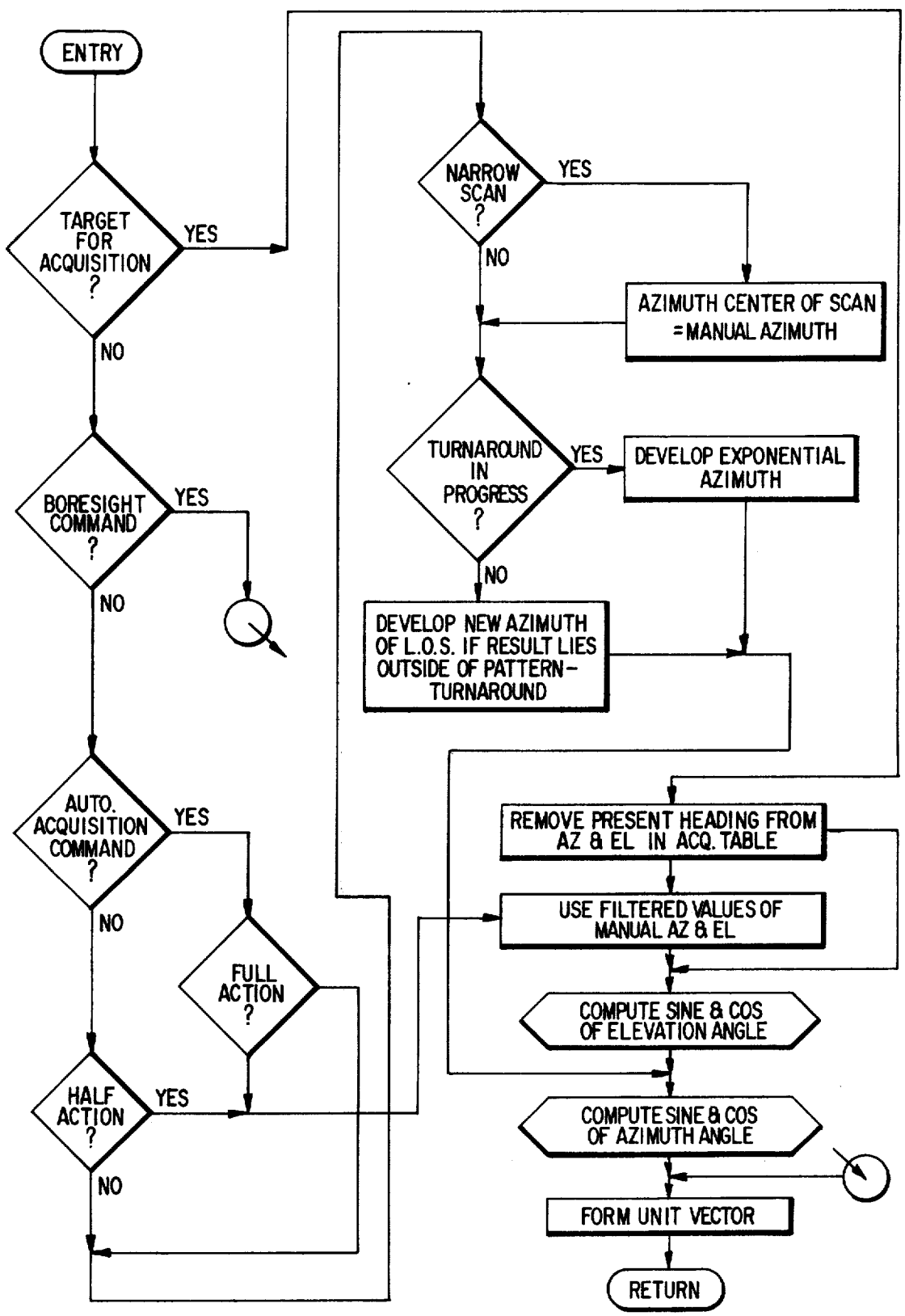
FIG. 18B L.O.S COMMAND GENERATOR & CONTROLLER ELEMENT (S4)

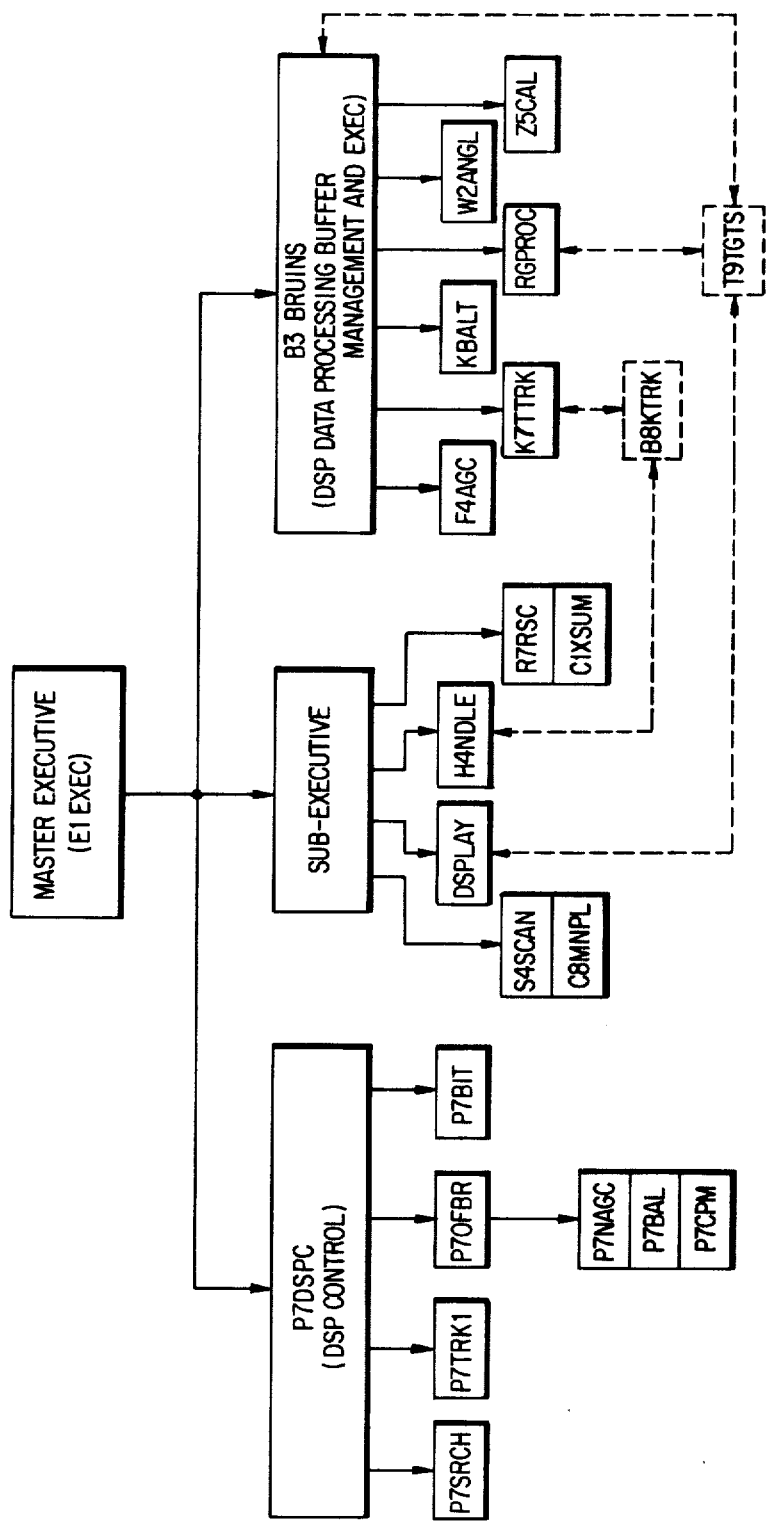
FIG. 19 RADAR CONTROL COMPUTER PROGRAM FLOW

DIGITAL RADAR CONTROL SYSTEM AND METHOD

BACKGROUND OF THE INVENTION

1. Field of the Invention

The present invention relates to radar systems and, in particular, to a method and radar system for acquiring and tracking targets through the use of digital techniques performed primarily by a low cost, high reliability programmed digital computer.

2. State of the Prior Art

Typical prior art radar systems employ analog and digital techniques for performing the functions required to acquire and track targets in a radar system. For example, in previous radar systems, the target tracker and automatic gain control functions are typically hardware functions and the angular tracking error signals are usually developed by specific hardware elements. Such systems are typically very complex and, because of this complexity, are not as reliable as desired. Moreover, the versatility of such systems is minimal because changes in the hardware configuration require redesign and rewiring.

The use of a programmed computer to perform these functions is desirable but has presented numerous problems. In addition to the complexity of the functions performed in acquiring and tracking targets in a radar system and the resultant program complexity, typical hardware techniques cannot be directly employed. Moreover, it is desirable to employ a small, low cost, high reliability computer such as the Westinghouse Millicomputer but such computers have a memory structure which is very difficult to program for complex operations such as those encountered in a radar system.

Another major problem in employing a programmed computer is the timing associated with the transfer of information throughout the system. In a typical radar system employing a Millicomputer, multiple computers may be employed depending upon the basic instruction execution time of the selected Millicomputer. For example, a radar control computer may be utilized as a master computer and may request and send information from and to other computers by self-command. This intercomputer communication is via direct memory access (DMA). While one DMA is occurring, all others are prevented from occurring. Therefore, if the radar control computer is sending or receiving information from another computer and the digital signal processor (DSP) has information to send to the computer, the DSP must wait. If the DSP is made to wait too long, the information is lost. Therefore the timing for DMA's is critical.

SUMMARY OF THE INVENTION

In order to overcome these and other problems, the radar system in accordance with the present invention utilizes a number of novel techniques and performs a number of novel functions in processing the radar data. For example, a range tracker in accordance with the present invention determines unambiguous range to a target through the use of a double precision technique which achieves the accuracy required for target tracking. The ambiguous target range from the digital signal processor is centroided by analyzing the amplitude of the target signal in the range cells above and below the target range cell. This ambiguous target range is then compared with the ambiguous track range developed from a tracking routine using double precision to produce a range tracking error which is accurate to $\frac{1}{4}^{15}$ range cells (approximately 1/80 foot). The range tracking error is integrated to develop a range rate. Main beam clutter velocity is subtracted from the range rate and the difference is filtered to provide target velocity. The difference is also used to develop unambiguous tracking range for display and control of the DSP. Unambiguous tracking range is also modulated by radar interpulse period (IPP) to produce the ambiguous track range used in developing the range tracking error.

In the development of azimuth and elevation angular tracking errors in accordance with the present invention, the computer develops the amplitude of the tracking error signal by first obtaining the difference between the target signal received from the DSP and the target AGC level (TAGC) developed by a target AGC routine. This error amplitude is normalized by the TAGC level and then demodulated in the computer by a timed delayed, phase corrected lobe on receive only (LORO) signal to develop the azimuth and elevation angular tracking error for use by the angle track loop. The phase correction is required because of the signal time delay through the receiver and the digital signal processor. The error amplitude is developed in double precision arithmetic to obtain maximum accuracy.

Noise AGC level (NAGC) is developed in accordance with the present invention by the programmed computer through the summation of a plurality of noise samples (e.g., 6 noise samples, one at each of 6 pulse repetition frequencies) during antenna turn-around, and by subtracting an average noise sum. This difference is then put into a first order filter simulated by the computer and the output is the noise/target AGC level used by the radar receiver.

Clutter AGC level (CAGC) is developed in accordance with the present invention by filtering the main beam clutter amplitude signal received from the digital signal processor. The CAGC level is based upon the larger of the clutter and target levels. This level is computed using double precision arithmetic and is used to adjust the state of a low noise amplifier (LNA) and a diode attenuator in the radar receiver.

The radar system according to the present invention also includes an altitude line tracker which locates and tracks the altitude line, i.e., the undesirable side lobe return from directly beneath the aircraft. The altitude line is located by locating apparent target return which, over a predetermined time period, remains at substantially the same range. In accordance with the invention, target data providing n of m correlations at about the same range over some relatively long period of time is designated the altitude line and such correlation places an altitude line tracker in A-line track mode. The altitude line (i.e., the apparent target data designated the altitude line) is thereafter tracked by a tracking loop which tolerates large range perturbations for relatively short periods of time but which cannot track at a high range rate. In the target track mode of the radar system, the target is excluded from the calculations for locating and tracking the altitude line.

With respect to transfer of information between computers, all inputs and outputs from the main radar control computer are accomplished in a block transfer. For example, inputs to the main computer are accomplished by first inhibiting all DMA's and requesting an internal computer DMA from the main computer to one of the other computers. After the inputs are ready, the internal computer DMA is allowed to occur and then all DMA's are allowed. This scheme minimizes lockout time. Each time an element wants to transfer information to the main computer, the information consisting of all words to be sent to the computer is stored in a buffer and the entire buffer is output. Therefore, most of the data transferred is that which the main computer already has in memory. However, if only new information were transferred each time, it would require more time to send only the selected data then to send all of the data because of the selection process.

BRIEF DESCRIPTION OF THE DRAWINGS

The operation of the radar system in accordance with the present invention will be appreciated by one skilled in the art to which the invention pertains from the following detailed description when read in conjunction with the attached drawings in which:

FIG. 4A is a more detailed functional block diagram of the buffer management and processing executive element of FIG. 3;

FIG. 4B is a flow diagram illustrating the operation of the buffer management and processing executive element of FIG. 4A;

FIG. 5A is a more detailed functional block diagram of the noise AGC level control element of FIG. 3;

FIG. 5B is a flow diagram illustrating the operation of the noise AGC level control element of FIG. 5A;

FIG. 6A is a more detailed functional block diagram of the search correlation output processing element of FIG. 3;

FIG. 7 is a more detailed functional block diagram of the altitude line tracker of FIG. 3;

FIG. 8A is a more detailed functional block diagram of the clutter AGC processor and loop filter of FIG. 3;

FIG. 8B is a flow diagram illustrating the operation of the clutter AGC processor and CAGC loop filter (level control) element of FIG. 8A;

FIG. 9A is a more detailed functional block diagram of the target tracker element of FIG. 3;

FIG. 10A is a more detailed functional block diagram of the target AGC loop filter and angle error processor of FIG. 3;

FIG. 10B is a flow diagram illustrating the operation of the target AGC loop filter and angle error processor element of FIG. 10A;

FIG. 11A is a more detailed functional block diagram of the DSP controller of FIG. 3;

FIG. 12A is a more detailed functional block diagram of the target storage and acquisition files element of FIG. 3;

FIG. 12B is a flow diagram illustrating the operation of the target storage and acquisition files (processing) element of FIG. 12A;

FIG. 13 is a more detailed functional block diagram of the target and antenna line of sight data formatter and reporter (display control element) of FIG. 3;

FIG. 15 is a flow diagram illustrating the DMA interface logic element of FIG. 3;

FIG. 16A is a more detailed functional block diagram of the hand control unit (HCU) interface logic and control element of FIG. 3;

FIG. 16B is a flow diagram illustrating the operation of the hand control unit interface logic and control element of FIG. 16A;

FIG. 17A is a more detailed functional block diagram of the radar set control (RSC) interface and mode control element of FIG. 3;

FIG. 17B is a flow diagram illustrating the operation of the radar set control interface and control element of FIG. 17A;

FIG. 18A is a more detailed functional block diagram of the line of sight (LOS) command generator and controller element of FIG. 3;

FIG. 18B is a flow diagram illustrating the operation of the LOS command generator and controller element of FIG. 18A; and, FIG. 19 is a flow diagram illustrating the logic flow of the overall radar control computer program.

DETAILED DESCRIPTION

General System Description

Figure 1:
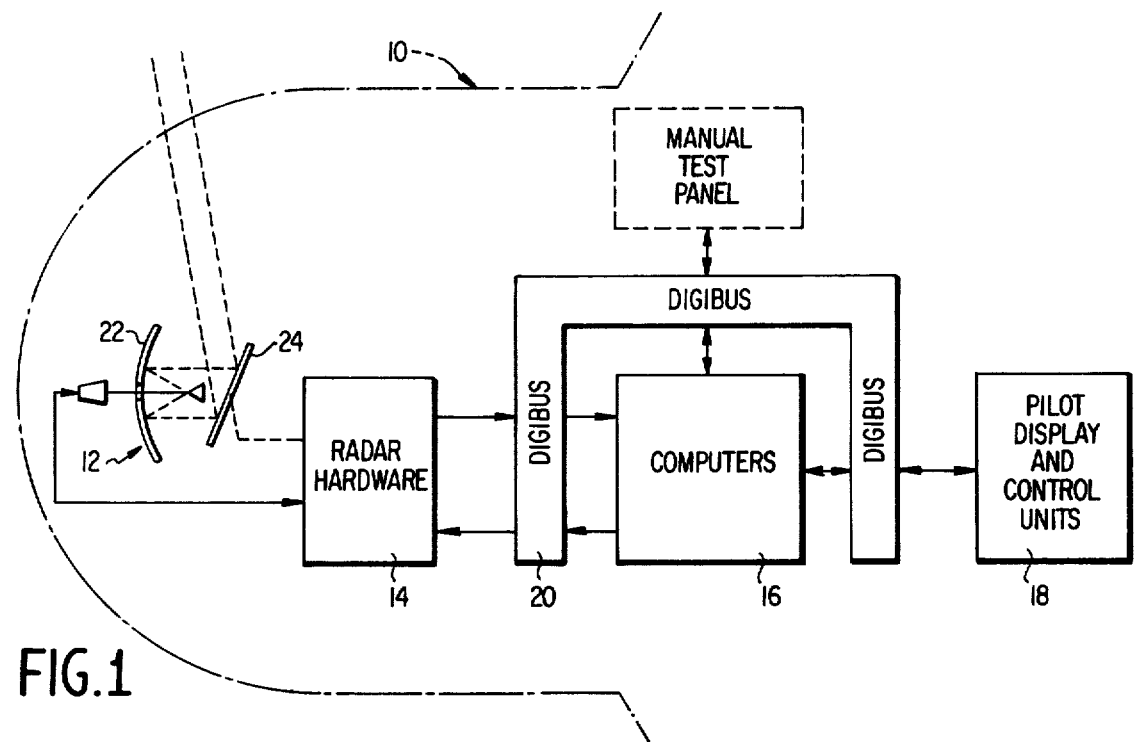
FIG. 1 is a general functional block diagram illustrating a radar system in accordance with the invention installed in an aircraft.

A radar system operable in accordance with the present invention is illustrated in FIG. 1. Since the invention has particular utility in the environment of an airborne radar system, the invention is illustrated in FIG. 1 in this environment in the forward portion of an aircraft 10 and is described hereinafter in this connection. It should, however, be understood that the invention may have other applications.

Referring to FIG. 1, the illustrated radar system generally includes an antenna assembly 12, suitable conventional radar hardware 14 such as transmit/receive units, antenna drive units and aircraft attitude signal generators, an antenna commanded position computer and a radar control computer 16 and a suitable pilot display and control unit 18. In the disclosed embodiment, the computers 16 are commercially available Westinghouse Electric Corp. Millicomputers and are connected to the external equipment through a commercially available Digibus 20. A manual test panel may be connected to the computers 16 through the Digibus 20 as described in U.S. patent application by Etow et al Ser. No. 691,145, filed May 28, 1976, which is a continuation-in-part of Ser. No. 384,337, filed July 31, 1973 entitled "Method and System for the Monitoring and Testing of Computer Controlled Systems," now abandoned.

The antenna assembly 12, in the illustrated embodiment, is a casagrain type antenna and may include a sub-reflector 22 and a twist-reflector 24. The twist-reflector 24 may be gimbled for movement in azimuth and elevation and may be controlled as described in U.S. Pat. No. 3,821,738 by Elmen C. Quesinberry et al.

The Quesinberry et al patent is assigned to the assignee of the present invention and the disclosure is hereby incorporated herein by reference.

In the system illustrated in FIG. 1, the radar hardware 14 positions the twist-reflector 24 of the antenna assembly 12 and transmits and receives wave energy by way of the antenna assembly 12 in response to control signals generated by the computer 16. In positioning the sub-reflector 24, the required commanded position signals are preferably generated as described in the foregoing Quesinberry et al patent and as further described in U.S. Pat. No. 3,793,634 by Robert I. Heller et al entitled "Digital Antenna Positioning System and Method" and assigned to the assignee of the present invention. The disclosure of the Heller et al patent is hereby incorporated herein by reference.

In the foregoing Heller et al patent, an entirely digital system for commanding radar antenna position is disclosed and claimed. In accordance with the present invention, radar signal processing involved in scanning or searching for a target, acquiring and tracking a target and providing a visual display function typically performed by hard wired analog circuitry, is performed digitally. In the preferred embodiment of the invention, a programmed radar control computer operable in conjunction with the radar hardware performs these functions as will hereinafter be described in greater detail.

For example, various automatic gain control (AGC) signals such as noise AGC (NAGC), clutter AGC (CAGC), and target AGC (TAGC) levels are typically computed through the use of hardware associated with the radar transmitter/receiver unit. In the system of the present invention, the transmitter/receiver unit of the radar system of FIG. 1 is still included as part of the radar hardware 14 but the various AGC computations are performed digitally by the radar control computer 16. Similarly, target tracking, target acquisition and target displaying computations are performed digitally in accordance with the invention as will subsequently be described.

Figure 2:
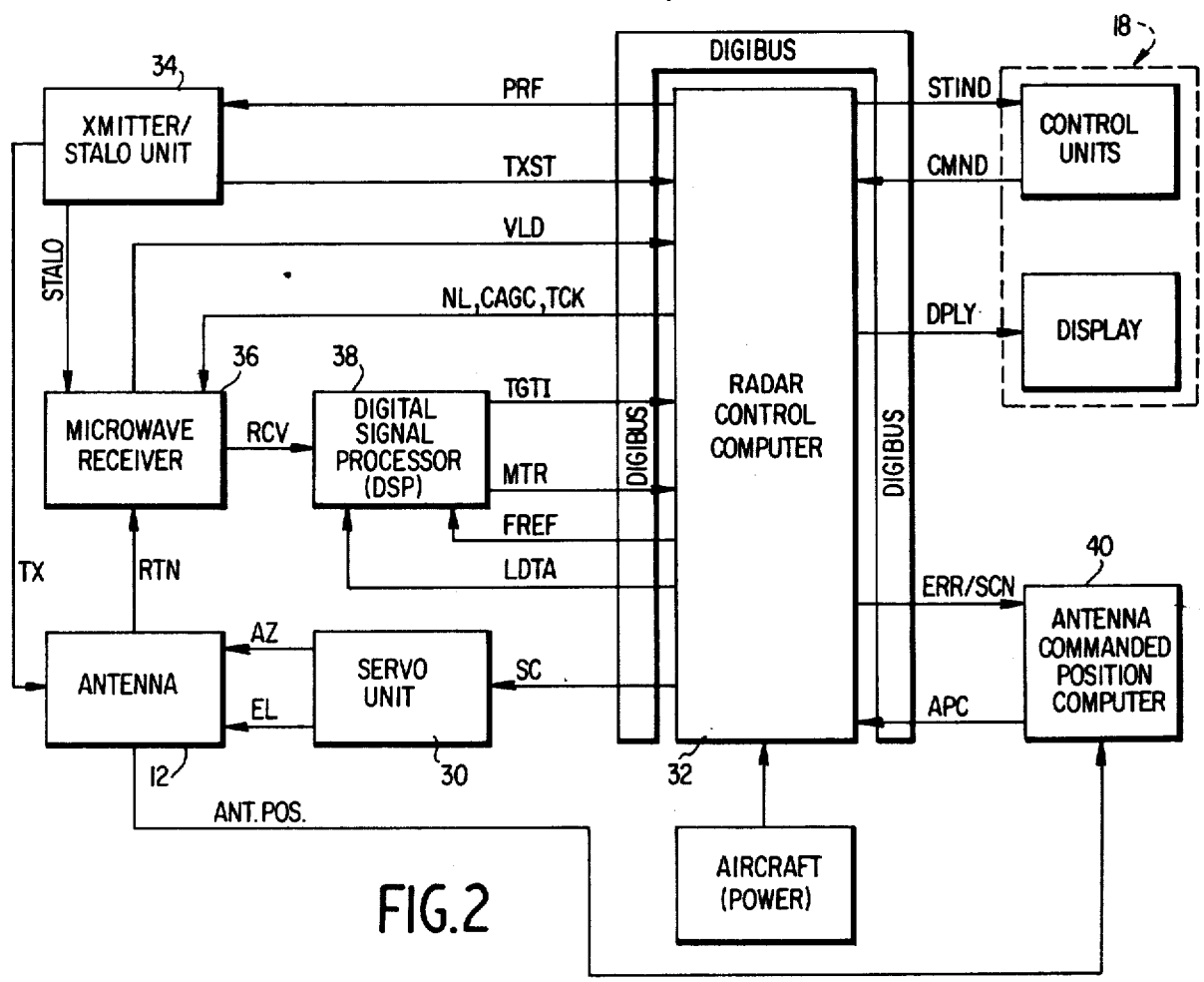
FIG. 2 is a functional block diagram illustrating in greater detail the interrelationship between the radar control computer of FIG. 1 and the external equipment associated therewith.

In FIG. 2 there is provided a more detailed functional block diagram showing the relationship between the radar system hardware 14 and the computer 16. With reference to FIG. 2, the antenna 12 may be driven in azimuth (AZ) and elevation (EL) through a servo unit 30 under the control of servo control signals SC from a radar control computer 32. A transmitter/stable oscillator (STALO) unit 34 may be controlled by a signal PRF from the radar control computer 32 to transmit a signal TX by way of the antenna 12. A transmitter status signal TXST may be supplied from the transmitter/STALO unit 34 to the computer 32, and a signal STALO from the unit 34 may be applied to a microwave receiver 36 for mixing with return or echo signals RTN supplied to the receiver 36 from the antenna 12.

Detected or received radar signals RCV from the microwave receiver 36 may be applied to a suitable digital processor (DSP) 38 for generation of target and threshold information. A validity signal VLD indicative of the status of the microwave receiver 36 may be supplied to the computer 32 and various AGC and receiver control signals may be supplied from the computer 32 to the receiver 36.

The digital signal processor 38 may supply target and threshold data signals TGTI to the radar control computer 32 together with monitoring signals MTR indicative of the various operations being performed by the digital signal processor 38. The radar control computer 32 may supply fixed or constant reference data FREF to the DSP 38 as required during the operation of the DSP and may also supply dynamic "look" data LDTA required for the operation of the digital signal processor 38.

Various command signals CMND may be supplied from the control units of the pilot display and control unit 18 to the radar control computer 32, and the radar control computer 32 may supply various status words or indication signals STIND to the control units as indication of proper operation of the radar control computer 32 in response to the command signals CMND. The radar control computer 32 may also supply display control signals DPLY to the display and control units 18 to thereby provide the pilot with a visual indication of targets and the like.

An antenna commanded position computer 40 may receive tracking error signals ERR or other signals indicative of a desired position of the antenna 12 (e.g., scans signals SCN in search mode) and may generate appropriate antenna position command signals APC for controlling the position of the antenna 12. The ERR/SCN signals may be provided from the radar control computer 32, and the APC signal may be supplied to the servo unit 30 from the antenna commanded position computer 40 through the radar control computer 32. The operation of the antenna commanded position computer 40 in positioning the antenna 12 is described in the previously referenced Quesinberry et al and Heller et al patents.

RADAR CONTROL COMPUTER OPERATION

The operation of the radar control computer 32 in conjunction with the radar hardware 14 and the antenna 12 may be more clearly understood with reference to the functional block diagrams of FIGS. 3 and 4A-12A, 13, 16A, 17A and 18A and with reference to the flow diagrams of FIGS. 4B-18B. In FIGS. 3-18B, the computer 32 is broken down into functional elements to illustrate functions performed by the computer 32 and to show signal flow between the computer 32 and the radar hardware. Also provided hereinafter is an assembly language listing of a program for performing the functions specified in connection with FIGS. 3-18. To provide correspondence between the functional elements of FIGS. 3-18 and the assembly language listing, each of the elements shown in FIG. 3 and further expanded in FIGS. 4-18 is provided with an alphanumeric designation corresponding to a portion of the assembly language listing. Thus, for example, the buffer management and processing executive element designated B3 in FIG. 3 is shown functionally in greater detail in FIGS. 4A and 4B, and is implemented in assembly language routine in accordance with the section of the listing designated B3 BRUINS.

Figure 3:
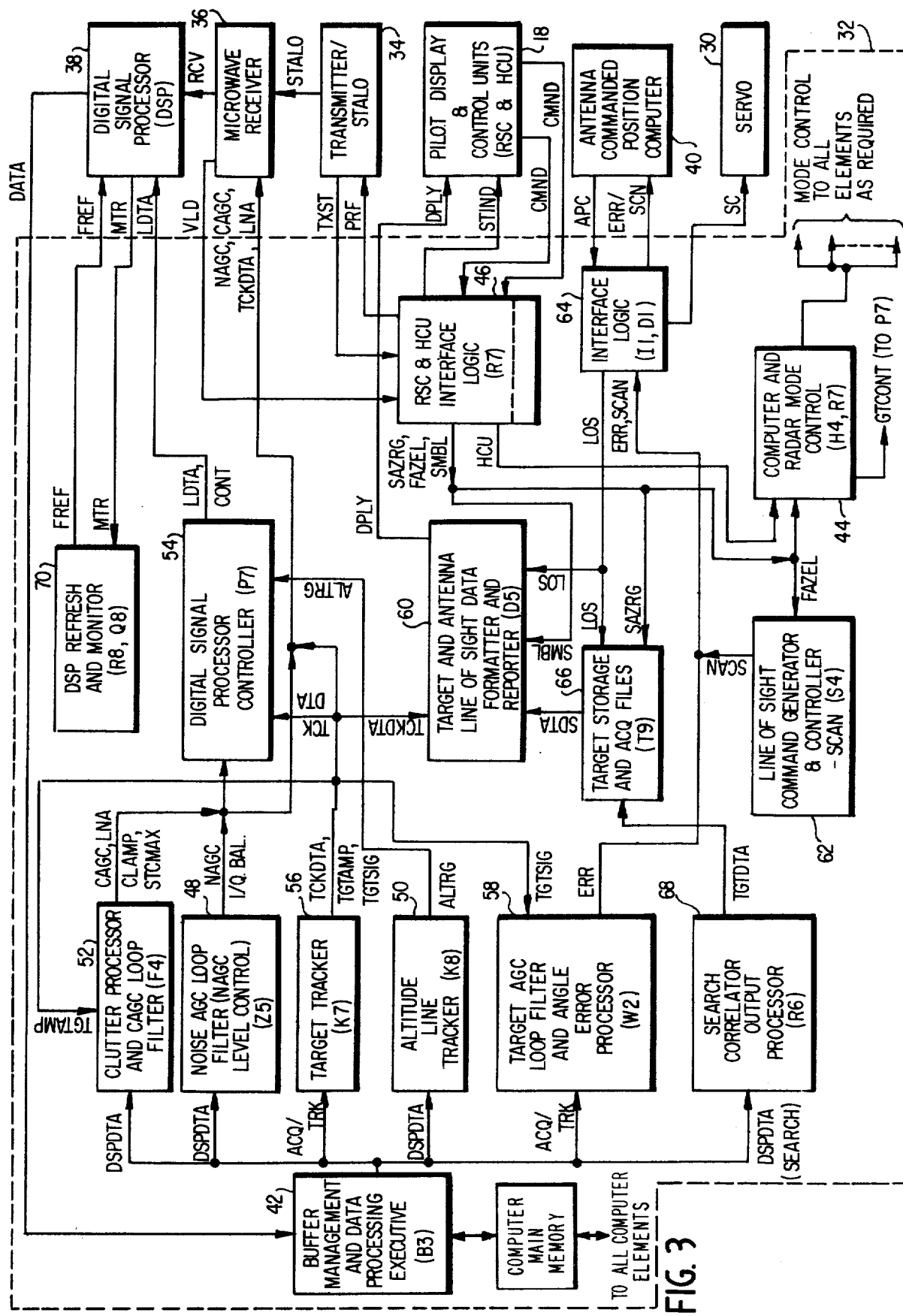
FIG. 3 is a more detailed functional block illustrating the processing elements of the radar control computer of FIG. 2.

Referring now to FIG. 3, a buffer management and data processing executive element 42 receives the DATA signals from the digital signal processor 38 and acts, in conjunction with a master executive element (E1) discussed hereinafter, as a master control unit for controlling the overall operation of the computer 32. The radar system may be placed in a built in test mode (BIT), a go to track mode (GOTK), a normal mode (NORM) or a no processing mode (NPRC). The various modes may be selected by the computer through commands initiated by the pilot at the radar control unit 18 (e.g., a hand control unit - HCU) and mode control or command signals CMND may be supplied to a computer and radar mode control element 44 through appropriate interface logic 46.

Command signals CMND from other pilot control units (e.g., a radar set controller - RSC) may also be supplied through the interface logic element 46 to a target and antenna line of sight data formatter and reporter 60, to the computer and radar mode control element 44 and to a line-of-sight command generator and controller 62. These command signals, interfaced by the logic element 46, may include hand control unit half and full action indication signals HCU, filtered joy stick (i.e., hand control unit) azimuth and elevation signals FAZEL, acquisition symbol azimuth and range signals SAZRG, and various symbol position and scaling signals SMBL.

Status indication and indicator control signals STIND may be supplied from the interface logic 46 to appropriate ones of the display and control units 18 to provide an indication of proper receipt of the command by the computer 32 and to operate various indicator lights on the radar set controller RSC. A radar pulse repetition frequency signal PRF initially commanded by the pilot may be supplied from the interface logic 46 to the transmitter/STALO unit 34 to initially control the radar PRF as will hereinafter be described in greater detail.

The computer and radar mode control element 44 may decode the signal TXST from the transmitter and the command signals CMND supplied from the control units 18 and supply a gate control signal GTCONT indicative of transmitter timing as well as mode control signals. The GTCONT signal may be supplied to a DSP controller discussed hereinafter and the mode control signals may be supplied to all other elements of the computer 32 as required. For example, the mode control signals from the computer and radar mode control element 44 are supplied to the buffer management and data processing executive 42 to effect various data processing routines in accordance therewith. With the radar in the built in test mode BIT, for example, the information from the digital signal processor 38 is supplied to a noise AGC loop filter 48 to establish a static or thermal noise AGC level NAGC for controlling the static noise level of the receiver 36. I and Q channel balancing signals I/Q BAL may also be developed for use by the digital signal processor 38 as supplied thereto from a digital signal processor (DSP) controller 54.

In each of the other three computer modes (GOTK, NORM and NPRC), the information supplied from the digital signal processor 38 to the buffer management and data processing executive 42 is used by an altitude line tracker element 50 to locate and keep track of the altitude line and to report on altitude line position or range ALTRG to a digital signal processor DSP controller 54 for blanking or other control purposes such as PRF selection. A clutter processor and clutter AGC loop filter element 52 is supplied with information from the digital signal processor 38 in each of the other three modes so that the location and level of main beam clutter may be determined and an appropriate clutter AGC signal CAGC may be developed for use by the receiver 36 and by the DSP 38 as supplied thereto by the DSP controller 54. Other control and/or level signals such as a low noise amplifier on/off signal LNA, a clutter amplitude signal CLAMPL and a slow time constant control signal STCMAX may also be supplied from the clutter processor and clutter AGC loop filter 52 to the receiver and to the DSP controller 54 which in turn controls the operation of the digital signal processor 38 in accordance with the current system mode.

In go to track mode GOTK (acquisition and track), the buffer management and data processing executive 42 also supplies appropriate acquisition/track information ACQ/TRK from the digital signal processor 38 both to a target tracker element 56 and to a target AGC loop filter and angle error processor 58. With the radar system in acquisition and track mode, the target tracker 56 develops information as to target amplitude, velocity and range, and supplies this information as the TCKDTA signal to the digital signal processor controller 54 and to a target and antenna line-of-sight data formatter and reporter 60. Other target information such as total target amplitude TGTAMP and target signal amplitude TGTSIG may be supplied, respectively, to the clutter processor and CAGC loop filter 52 and to the target AGC loop filter and angle error processor 58. An indication that the radar system is in track may also be supplied from the target tracker 56 to the microwave receiver 36 to perform conventional switching functions therein.

The target AGC loop filter and angle error processor 58 develops appropriate target AGC signals (TAGC) and target angle error signals (ERR) to an interface logic element 64. A line-of-sight command generator and controller 62 generates antenna scan signals SCAN and the interface logic element 64 supplies either the target angle error signal ERR or the scan signal SCAN to the antenna commanded position computer 40 to position the radar antenna. The commanded position signals APC from the computer 40 are supplied through the interface logic element 64 to the radar servo system 30 as the servo control signal SC. The interface logic element 64 also supplied antenna line-of-sight signals LOS to a target storage and acquisition file element 66 and to the target and antenna line-of-sight data formatter and reporter 60. Target search information stored in the target storage and acquisition file 66 (the SDTA signal) is also supplied to the target and antenna line-of-sight formatter and reporter 60 which in turn supplies display control signals DPLY to the pilot display and control units 18.

In normal mode NORM (search), DSP search data signals DSPDTA are supplies from the buffer management and data processing executive element 42 to a search correlator output processor element 68 in addition to the elements 50 and 52 discussed previously. As targets are located during the search mode, target location information TGTDTA is supplied from the search correlator output processor element 68 to the target storage and acquisition files 66 for later reference and for comparison in acquiring a target.

A DSP refresh and monitor element 70 may monitor the operation of the DSP 38 through the receipt of monitoring signals MTR and may provide the DSP 38 with fixed reference data FREF, e.g., constants and program data required during the operation of the DSP 38 as in a Fast Fourier Transformer Doppler frequency processing operation discussed in connection with United States patent application Ser. No. 672,823, filed concurrently herewith by Wayne L. Weigle et al for "Method and System for Clutter Blanking In A Radar Signal Processor." The Weigle et al application is assigned to the assignee of the present invention and is hereby incorporated herein by reference. The DSP 38 receives variable reference data LDTA (e.g., signal levels and gains) and operation control signals CONT (e.g., I/Q channel balance controls) from the DSP controller 54 to perform the signal processing functions described in the Weigle et al application.

Various status signals may be provided to the radar control computer 32 in addition to those already discussed. A transmitter status signal TXST may be provided from the transmitter/STALO unit 34 to the interface logic 48. Similarly, a status signal VLD may be supplied to the interface logic 46 from the receiver 36 as an indication of the validity of the receiver output data RCV.

Buffer Management And Processing Executive (B3)

The various elements shown in FIG. 3 are further expanded in FIGS. 4–16 to facilitate an understanding of the operation of the radar control computer 32. Referring now to FIGS. 4A and 4B wherein a block diagram and a flow diagram illustrate the operation of the buffer management and processing executive 42 (B3) of FIG. 3 in greater detail, the target information from the digital signal processor 38 is received by the buffer management and processing executive B3 at the point designated ENTRY in FIG. 4B. The format for the DATA signal supplied to the computer is as follows:

sponding to that particular DSP data dump. If the computer is in track or a target is confirmed, the buffer management and processing executive instructs the computer through the routines designated in the go to track (GOTK) mode. If go to track mode is not appropriate, an acquisition table, i.e., a table noting the positions of targets, is formed if the operator has designated full action and the table is not already formed. If the table is already formed, and there is time enough for a target to be confirmed, the buffer management and processing executive returns computer returns to manual acquisition/search mode. If full action has not been initiated or if there is not time enough for the target to be confirmed, the buffer management and processing executive instructs the computer through the routines in normal (NORM) mode as illustrated in FIG. 4B.

During normal search operations, the buffer management and processing executive examines a "detect flag" to see if a target has been detected. If no target flag is seen, then the condition of the pilot's hand control unit (joy stick) is input to see if the pilot has completely depressed the trigger on the stick control. If a target has been detected, then the target storage and acquisition files (T9) is called.

TABLE I

| Word #/Bit | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| 0 | LBEN | IPA EN | PSP XEN BIT | LR | ED | ET | VCC LRB | VCC LFB | VCC RB | VCC LFB | VCC TFB | PAR EN | BIT | BIT | BIT |
| 1 | | | IPPHLK | | | | I | | | RGIPP | | | | | |
| 2 | | | (SPARE) | | | | | | I | | | | | | |
| 3 | MBC PET (SPARE) | | I | | | I | | | | CRANGE | | | | |
| 4 | | | | | | | MBCAMP | | | | | | | | |
| 5 | | | | | | | NOSAMP | | | | | | | | |
| 6, 8, ... 36 | FOR DET | TGT DET | AT DET | | DFILTR | | | I | | | DRANGE | | | | |
| 7, 9, ... 37 | | | | | | | DETAMP | | | | | | | | |
| 38–53 | | | (SPARE) | | | | I | | | UNAMRG | | | | | |
| 54 | | | CLORO | | | | I | | | (SPARE) | | | | | |
| 55 | | | SLORO | | | | I | | | (SPARE) | | | | | |

If the DSP data contains new information not previously received, the buffer management and processing executive 42 places the data into appropriate buffer and storage units for processing. If the data does not contain new information, the processing continues without the need for buffer management. The storage and use of the buffered data is coordinated by buffer input and processing controllers as functionally shown in FIG. 4A to insure that data is not being read from a buffer as the buffer is being accessed for entry.

As was previously described, the processing of target information occurs over periods of multiple returns, i.e., time intervals which include multiple interpulse periods of the radar, referred to hereinafter as "look" periods. Until the data for a "look" period has been completely processed, the buffer management and processing executive continues to instruct the computer as to those functions which should be performed in the selected mode. As can be seen in FIG. 4B and as will be described hereinafter, the buffer management and processing executive element B3 instructs the computer through the various routines as indicated by the switching functions in FIG. 4A and supplies the data to the appropriate elements depending upon the mode of operation selected by the radar operator and the status of the data processing operations of the computer.

As soon as the data for a "look" period has been processed, the buffer management and processing executive extracts the interpulse period and look time corre- With continued reference to FIG. 4B, the target storage and acquisition files element stores up to a maximum of 16 targets and, when called by the buffer management and processing executive element, it checks to see if the information which it has received from the digital signal processor coincides with any of the 16 targets in the target storage table. If the stored information does not agree with the information from the DSP, then the next step is to try to confirm the target. In this connection, the buffer management and processing executive calls the altitude line tracker (K8) and, by examining the data received from the DSP, it can be determined that if successive detections are occurring in a specific range cell then this should be considered to be the altitude line. The DSP is then instructed by the digital signal processor controller (P7) to blank the particular range cell. This procedure is repeated until a target is confirmed by assuring that the DSP detection agrees with the last target in the target acquisition table.

When a target has been confirmed, the buffer management and processing executive then calls a new sequence of elements which together define the go to track mode (GOTK). The range tracker element (K7), the altitude line tracker element (K8), the clutter processor and clutter AGC loop filter (F4) and the target AGC loop filter and angle error processor (W2) are called in sequence in the GOTK mode.

In summary, the buffer management and processing executive keeps track of the status of the selected modes of operation of the computer at all times and the status of the target data processing being performed by the computer. In response to this status information, the buffer management and processing executive controls the computer through an appropriate series of routines and supplies the appropriate DSP data to the computer elements.

NOISE AGC LOOP FILTER (Z5)

When the system is in its test mode of operation (BIT), the buffer management and processing executive B3 effects the calculation of noise AGC level by the noise AGC loop filter or NAGC level controller element Z5. With reference now to FIGS. 5A and 5B, the noise AGC level control element Z5 collects the sums one noise sample at each of 6 radar pulse repetition frequencies during antenna turn-around. The sum of these noise samples is then compared against a threshold (an average noise sum) and the difference is then input into a first order filter simulated by the element Z5. The resulting output signal is the noise AGC level which is provided to a diode attenuator in the microwave receiver.

In addition, the DSP is checked arithmetically to insure that the I and Q channels of the DSP 38 are balanced. If the I and Q channels are not properly balanced, the I/Q BAL signals which control I and Q channel balancing are modified until proper balance is attained.

SEARCH CORRELATOR OUTPUT PROCESSOR (R6)

Figure 6B:
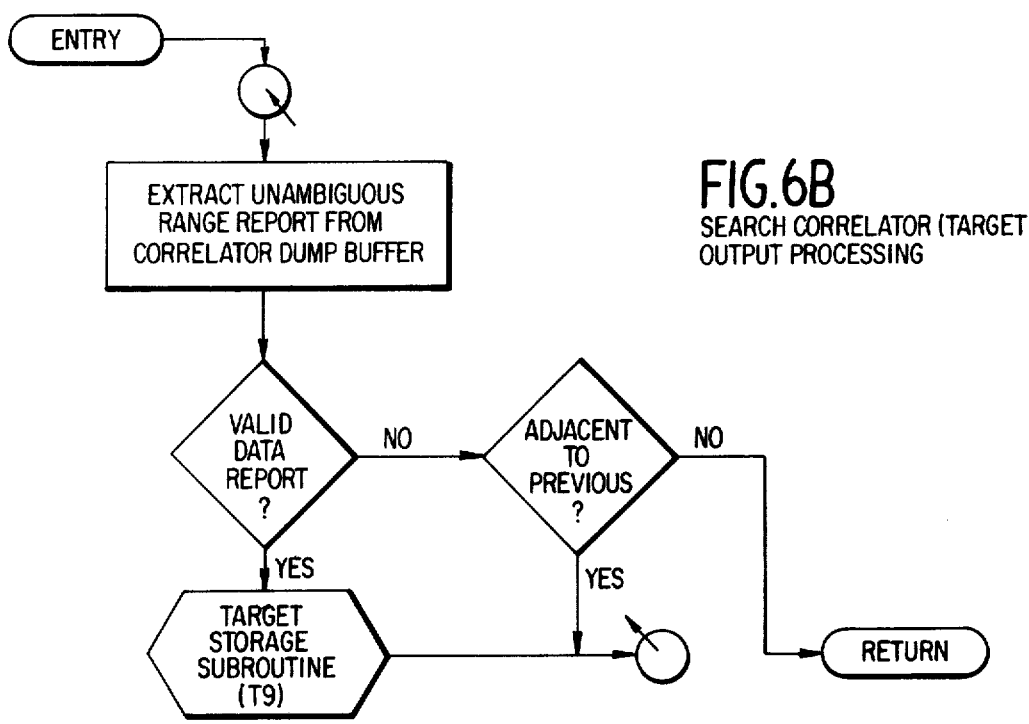
FIG. 6B is a flow diagram illustrating the operation of the search correlator output processing element of FIG. 6A.

In normal mode when the radar system is searching for targets, the buffer management and processing executive B3 calls up the NORM sequence of routines, i.e., the routines R6, K8 and F4. Referring now to FIGS. 6A and 6B, the search correlator target output processing element R6 eliminates range gate straddling and supplies target data to the target storage and acquisition files T9.

The search correlator output processing element R6 first extracts an unambiguous range report from the correlator dump buffer. If the data report from the correlator dump buffer is valid, the target storage and acquisition files element T9 processes the target information in accordance with a target storage subroutine hereinafter described. The search correlator output processing element thereafter continues to process target range data to form the target storage files. If the data report from the correlator dump buffer is invalid, and is adjacent to the previous target, the processing of the search correlator R6 continues. However, if the invalid data is not adjacent to a previous target, control is returned to the executive.

ALTITUDE LINE TRACKER (K8)

In normal mode, the altitude line tracking element K8 examines the data received from the digital signal processor as shown in FIG. 7. If, within a specific range cell, many detections are occurring, the altitude line tracker considers this to be the altitude line and instructs the digital signal processor to blank this range cell.

As shown in FIG. 7, the DSPDTA signal is monitored by an altitude line detector which provides an indication of altitude line detection if apparent target data appears at about the same range for "$n$ of $m$" detections. An "$n$ of $m$" correlation places the altitude line tracker into altitude line track, after which the altitude line tracker K8 continues to track the detected altitude line as long as there is no drastic change in the average altitude line range data. Sudden changes of short duration accordingly do not affect the tracking of the altitude line.

CLUTTER AGC PROCESSOR AND LOOP FILTER (F4)

Also, during normal mode, the clutter processor and clutter AGC loop filter element F4 locates main beam clutter and provides clutter information to the DSP controller P7 and to the microwave receiver. Referring now to FIGS. 8A and 8B, the clutter AGC processor and loop filter develops a time extended main beam clutter (MBC) detection level and, through comparison with received radar signals, determines whether or not main beam clutter is present. If signals above the signal detection level are present, the clutter AGC processor selects the larger of the amplitudes of main beam clutter or a target being tracked. If no signals above the detection level are present indicating that main beam clutter is not present, the target amplitude is selected.

The selected amplitude (either target or main beam clutter) is compared with a threshold level THRESH and the difference is filtered. The clutter AGC processor and clutter loop filter thereafter develops appropriate LNA and CAGC levels for the low noise amplifier (LNA) and diode attenuator, respectively, in the microwave receiver and scales and outputs the data to the receiver as was previously described. Also, an averaging filter generates the clutter amplitude signal CLAMPL from the MBCAMP signal and the STC control signal STCMAX is developed from the CAGC signal.

TARGET TRACKER (K7)

With the radar in normal mode, the buffer management and processing executive B3 instructs the radar to go to track (GOTK) mode when a target is confirmed. In go to track mode, the elements K7, K8, F4 and W2 are called in sequence.

Figure 9B:
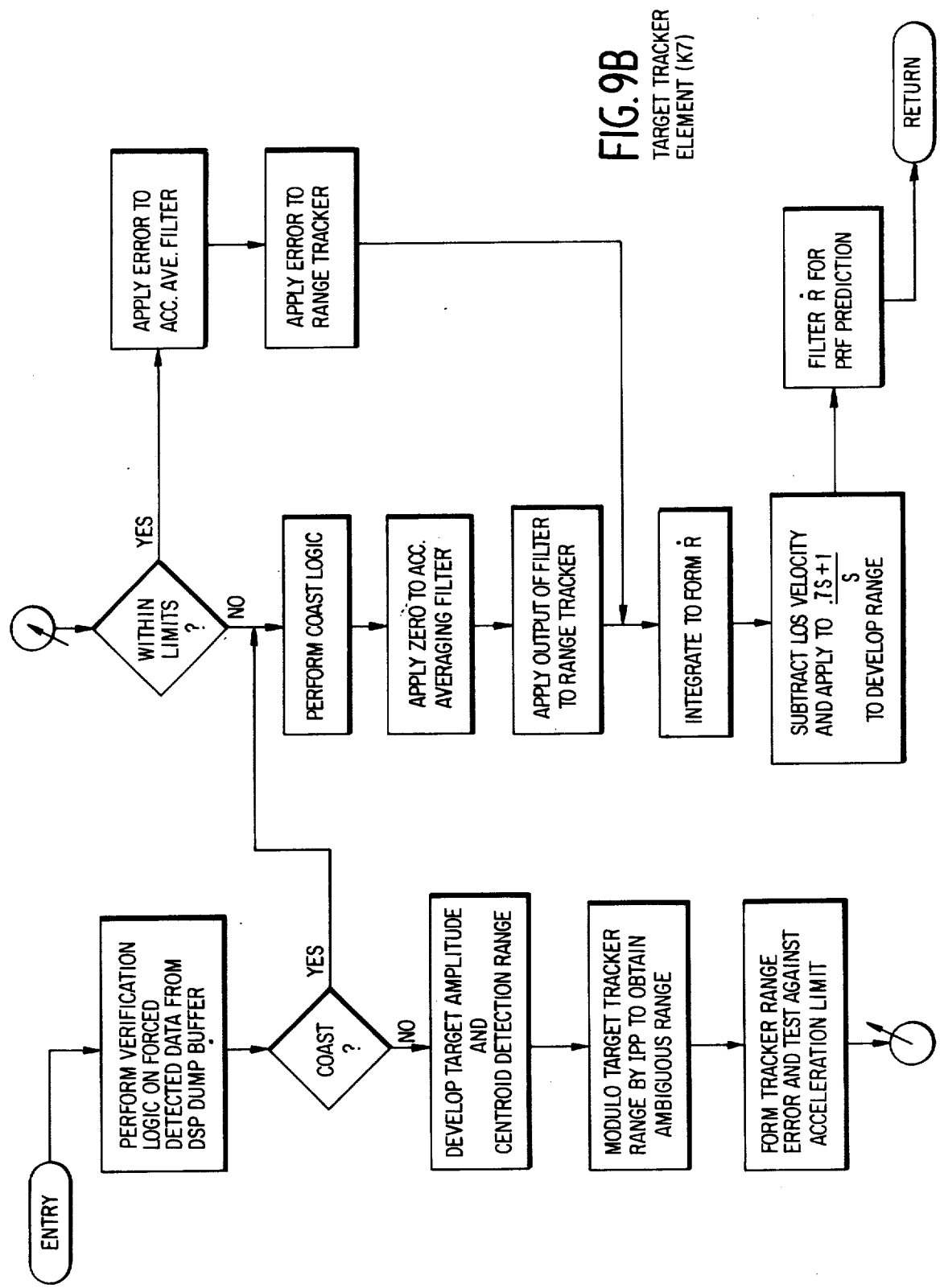
FIG. 9B is a flow diagram illustrating the operation of the target tracker element of FIG. 9A.

Referring now to FIGS. 9A and 9B, the target tracker element K7 accepts range gated data ACQ/TRK including range, ambiguous velocity and target amplitude from the digital signal processor. This data is then processed to determine the presence of a target and/or jammer information. Upon verification of target information, the range and amplitude data are combined, if the radar is not in coast, to obtain a centroided range detection. The total target amplitude TGTAMP including signal and noise is supplied to the CAGC element F4 and the target signal amplitude TGTSIG is supplied to the TAGC and angle error processor element W2.

The centroided range detection is subtracted from the present value of the range tracker to provide a range error signal RERR. The resulting error signal is tested for acceptance against a dynamic acceleration limit and upon acceptance, the error signal is integrated twice to form a type 2 tracking loop.

The output from the first integrator represents range rate ($\dot{R}$) from which the velocity component of the aircraft (main beam clutter velocity MBCVEL) is subtracted. The result, the target's radial velocity serves as the input to the second integrator to develop actual range. In addition, the range rate $\dot{R}$ is filtered to provide a PRF prediction based upon doppler and speed consideration. Moreover, if the target is not verified, the system may be placed in coast and the range rate may be kept constant until target verification can again be accomplished.

The sequence of operations in go to track mode continues through the altitude line tracker element K8 and the clutter processor and CAGC loop filter element F4 previously described. In addition, the target AGC loop filter and angle error processor element W2 is called up in go to track mode.

TARGET AGC LOOP FILTER AND ANGLE ERROR PROCESSOR (W2)

Referring now to FIGS. 10A and 10B, the target AGC and angle error processor element W2 develops a target AGC level and the azimuth and elevation angular tracking errors. In the development of the angular tracking errors, the sine and cosine of the lobe on receive only (LORO) data from the DSP used by element W2 is delayed for two passes to account for the fact that all of the data received from the DSP has already been time delayed except for these two quantities. The lobe on receive only (LORO) frequency is then further modified to account for time delays in the receiver and DSP.

Specifically, the sine and cosine of the phase angle correction for LORO are computed and these phase angle corrections are applied to the double buffered LORO angles to obtain the LORO reference angles. The target AGC level is developed by applying the target signal amplitude TGTSIG to a 15 Hz loop filter simulated by the processor element. TAGC is removed from the amplitude of the target signal (e.g., by subtraction) and the result is normalized (e.g., by dividing the result by the TAGC level) to produce the normalized amplitude of the angular tracking error. Using the developed LORO referency angles, the azimuth and elevation angle error signals used in the angle track loop are separated by demodulating the normalized difference signal.

It should be noted that the phase correction applied to the LORO angles is required because of the signal time delay through the receiver and the digital signal processor. Moreover, the signals are developed in double precision arithmetic to obtain maximum accuracy.

DSP CONTROLLER (P7)

Figure 11B:
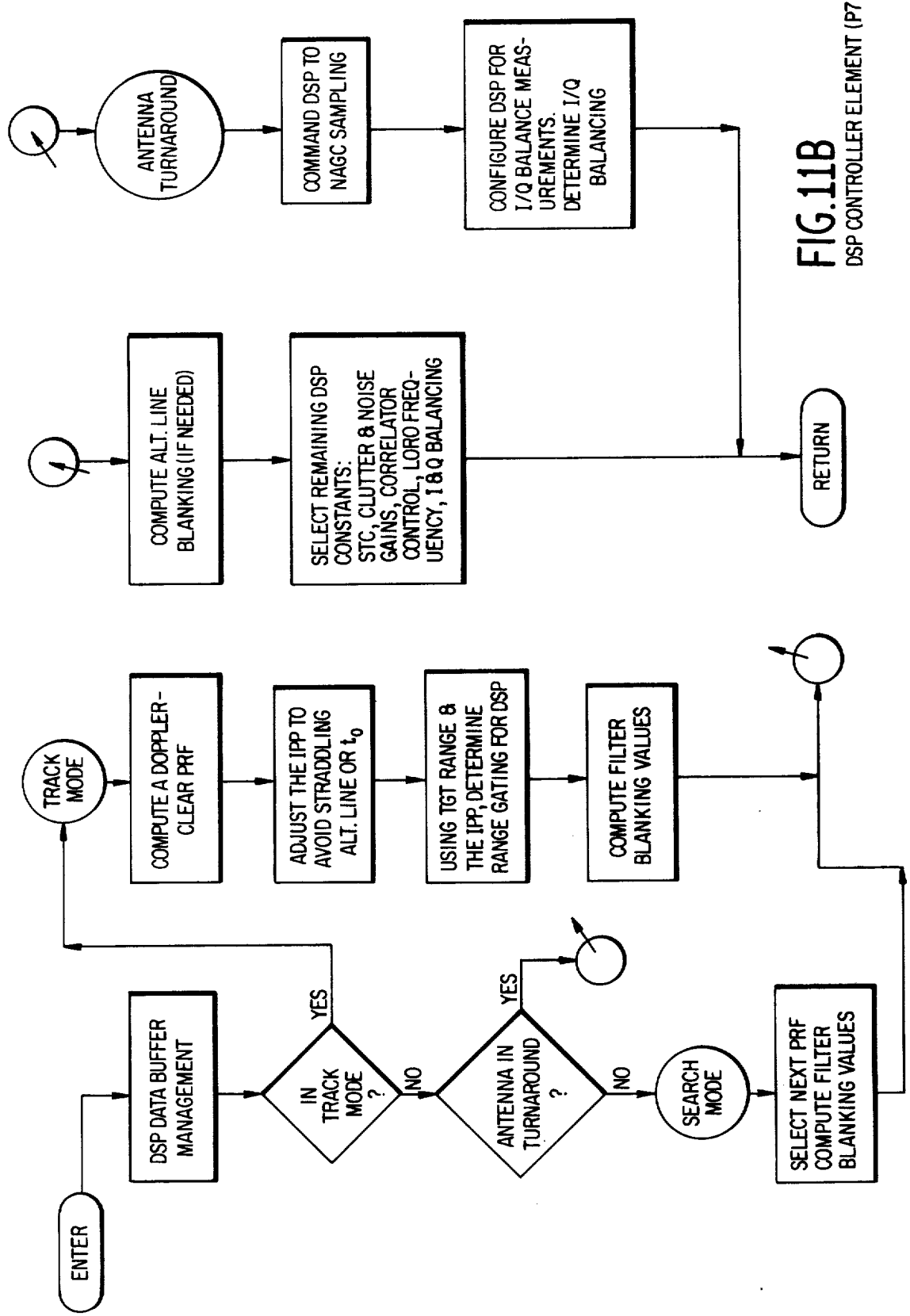
FIG. 11B is a flow diagram illustrating the operation of the DSP controller element of FIG. 11A.

Control of the digital signal processor 38 of FIG. 3 is accomplished by the digital signal processor controller element P7 illustrated in greater detail in FIGS. 11A and 11B. Referring now to FIGS. 11A and 11B, data supplied to the DSP controller element P7 is stored and retrieved as required. If the system is in track mode, the target and main beam clutter velocities TGTV and MBCVEL are used to compute a doppler clear pulse repetition frequency. The interpulse period is adjusted to avoid straddling the altitude line located by the altitude line tracker K8 and to avoid straddling time zero ($t_0$).

Using target range and the adjusted interpulse period, the appropriate range gating for the digital signal processor is determined and filter blanking values are computed. An altitude line blanking signal is computed, if needed, and the remaining digital signal processor constants such as clutter and noise gains, etc., are selected. The various range gating, blanking and constant data is then supplied to the digital signal processor from an output buffer to control the operation of the processor as is more fully explained in the previously referenced application by Wayne Weigle et al for "Method and System For Clutter Blanking In A Radar Signal Processor."

If the system is not in track mode and the antenna is not in turn-around, the system is in search mode and the DSP controller element P7 steps the radar system through various pulse repetition frequencies. The filter blanking values are computed, the altitude line blanking value is computed and the DSP constants are selected in this mode as was previously described.

If the system is not in track mode and the antenna is in turn-around, the DSP is commanded to a noise AGC sampling mode so that the noise AGC level may be computed. In antenna turn-around, the digital signal processor is configured by the controller P7 for the quadrature or I and Q channel balance measurements so that the proper balancing of the I and Q digital signal processor channels may be determined as was previously described.

The digital signal processor 38 of FIG. 3 also receives constants and other reference signals from the DSP refresh and monitor element (R8, Q8) generally indicated at 70 in FIG. 3 as these signals are required in the processing of the radar signals. The refresh and monitor elements R8 and Q8 are not shown in detail but are included in FIG. 11A and in the program listing hereinafter.

All data supplied to the DSP from the radar control computer is supplied via the DSP controller P7 so that appropriate formatting and timing is ensured. The output data format for the data supplied to the DSP from the controller may be as follows:

TABLE II

| Word #/Bit | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| 0 | LBEN | IPA EN | XEN | PSP BIT | LR | ED | ET | VCC LRB | VCC LFB | VCC RB | VCC DFB | VCC TFB | PAR EN | | | |
| 1 | | | | IPPHLF | | | I | | | | RGIPP | | | | | |
| 2 | | | | | | | | (SPARE) | | | | | | | | |
| 3 | | | | CLRBST | | | I | | | | CLRBST | | | | | |
| 4 | | | | SPARE) | | | I | | CLFBST | | | I | | CLFBSP | | |
| 5 | | | | | CLNG | | | I | | | | | CLCG | | | |
| 6 | | (SPARE) | | | I | | MCW | I | | | | | CLNL | | | |
| 7 | | | | CRBST | | | | I | | | CRBST | | | | | |
| 8 | | | | (SPARE) | | | I | | CDFBST | I | | | CTFBSP | | | |
| 9 | | (SPARE) | | | VRBV T1SP | VRBV T2SP | I | | CTFBST | I | | | CTFBSP | | | |
| 10 | | | | | CNG | | | I | | | | CCG | | | | |
| 11 | | (SPARE) | | | I | HFFBW | | I | | | | | CNL | | | |
| 12 | | | | SAB | | | | I | ALBW | | | I | (SPARE) | | | |
| 13 | TWOFM | | | LKSELC- | | | T | | | | | STCMAX | | | | |
| 14 | | | | | | | LORO | | | | | | | | | |
| 15 | | | | | | | IQBAMP | | | | | | | | | |

TABLE II-continued

| Word #/Bit | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| | | | | DSP PROCESSOR INPUTS FROM COMPUTER (Each Look) | | | | | | | | | | | | |
| 16 | | | | | | | IQBPHA | | | | | | | | | |

TARGET STORAGE AND ACQUISITION FILES (T9)

The digital signal processor 38 of FIG. 3 also operates in conjunction with the target storage and acquisition files element T9 during target confirmation as was previously described. As is shown in greater detail in FIGS. 12A and 12B, the target storage and acquisition files element T9 is called as part of the search correlator output processor R6 routine to form acquisition files and to confirm targets. The target storage and acquisition files element T9 stores up to a maximum of 16 targets in response to the signal TGTDTA from the processor R6 and, when the acquisition table has been formed, the incoming target information is checked against the stored target information to see if there is coincidence therebetween. If coincidence is detected, the DSP data is confirmed as a target and the tracking loop is initialized. If there is no coincidence, control is returned to the search correlator output processor R6.

Similarly, if the acquisition table has not been formed, the system may be placed in either full action, half action or auto acquisition by the pilot. In full action, manual acquisition is commanded and, at the range and azimuth commanded by the pilot's hand control unit as represented by the SAZRG signal, an indication of target detection within a predetermined detection "window" results in a storage of target information in the acquisition table and the beginning of acquisition. If the pilot commands half action or if auto acquisition is not commanded, the target's parameters are stored and control is returned to the search correlator output processor element R6.

DISPLAY, SCAN CONTROL AND INTERFACE LOGIC

ELEMENTS (D5, S4, H4, R7, I1, D1)

The interface control functions performed between the radar control computer and the external hardware, such as the pilot display and control units 18, the servo unit 30, the transmitter 34, the receiver 36 and the antenna commanded position computer 40 of FIG. 3, are performed by the target and antenna line of sight data formatter and reporter element D5 (the display control element), the line of sight command generator and controller S4 (the scan controller), and the interface logic and mode control logic elements I1, D1, H4 and R7. Functional block diagrams and/or logic flow diagrams of these elements are provided in FIGS. 13-18 to facilitate an understanding of the operation of the present invention.

The target and antenna line of sight formatter and reporter element D5, the basic computer display control element, is functionally illustrated in the flow diagram of FIG. 13 and appears in the program listing hereinafter. The display control element D5 accepts and integrates input data from various sources in the radar control computer to provide appropriately scaled display information such as line of sight azimuth and elevation space angles, target range, target range rate and aircraft attitude. In addition, various symbols and alphanumerics as well as diagnostic messages may be displayed by the target and antenna line of sight formatter and reporter element D5 in the various radar modes.

For example, as is shown in FIG. 13, the SMBL signals including range scale information from the HCU interface logic H4 are received by the display control element D5 to provide appropriate alphanumerics to the pilot display unit. Target data both in track mode and search mode is supplied to the pilot display in response to the TCKDTA signal from the target tracker K7 and the SDTA signal from the target storage and acquisition files T9. Antenna and stick position information is supplied to the pilot display in the form of appropriate symbols in response to the LOS signals from the interface logic I1, D1 and in response to the SMBL signals from the HCU interface H4. The display control element formats all of this data and reports the data to the display unit for display.

Figure 14:
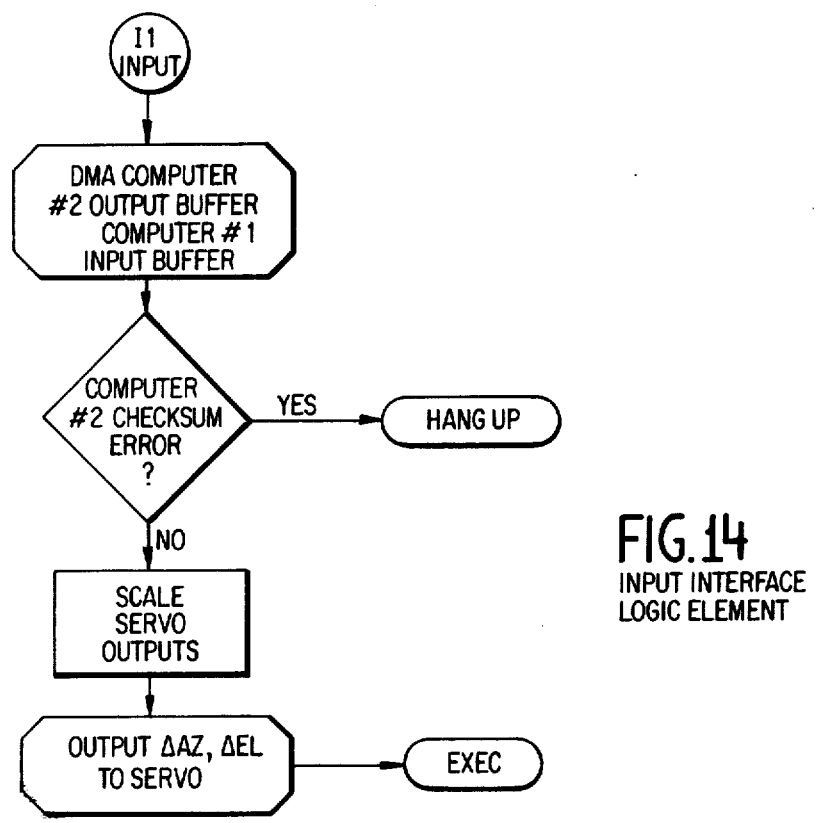
FIG. 14 is a flow diagram illustrating the operation of the input interface logic element of FIG. 3.

The input and DMA interfacing logic elements I1 and D1, respectively, are shown in the logic flow diagrams of FIGS. 14 and 15. These interface logic elements control the data DMA's between the radar control computer 32 and the antenna commanded position computer 40 of FIG. 3 as well as the output of data to the servo 30 of FIG. 3. As will readily be appreciated by one skilled in the art, the I1 and D1 elements of FIGS. 14 and 15 insure proper transfer of data between the computers and appropriately scale the data supplied to the servos. In addition, the results of a "checksum" routine C1, C2 (in program listing) are monitored to ensure that the transferred data is not erroneous.

As will be appreciated from the program listing, the memory employed within the computer is broken up into protected and unprotected memory blocks. All system constants are stored in protected memory blocks and system variables are placed in unprotected memory blocks designated as scratch blocks and global blocks. A global block is, in essence, a scratch block variable used for communiciation between elements. As constants are required by the elements of the radar control computer 32, the constants are transferred from the appropriate constant block (i.e., a protected memory block) to a scratch block (i.e., an unprotected memory block). In transferring constants to an unprotected memory block, it is necessary to insure that the constants maintain the same values after being transferred since, once in the unprotected memory block, there is nothing to prevent something from being erroneously stored in one of the constant memory locations thus invalidating the system program. The checksum procedure mentioned above and provided hereinafter in the program listing insures that all of the protected memory blocks and all of the transfer locations in unprotected memory are checked to insure that the protected memory remains valid.

The operation of the hand controller interface logic and control element H4 is illustrated in greater detail in FIGS. 16A and 16B. In response to command signals CMND initiated by the pilot through the hand controller, the hand control unit interface logic and control element H4 develops various control and indicator information in response to which the radar system functions as has been described previously. As can be seen in FIGS. 16A and 16B, for example, the hand control unit interface logic and control element H4 develops display information siganls SMBL, mode control information signals HCU and hand controller position signals FAZEL and SAZRG in response to various manually initiated commands. Element H4 also insures that the hand controller functions are coordinated with the other radar control computer functions as can be seen in more detail in the listing hereinafter.

The radar set control (RSC) interface and radar mode control element R7 is illustrated in more detail in FIGS. 17A and 17B. Radar set control command signals RSC are received from the control and display unit 18 and panel test logic is initiated in appropriated command signals are received. If the panel test is not initiated, the RSC interface and mode control element R7 eliminates and "stuck" buttons and inputs which are disallowed because of the system mode configuration.

In response to the valid CMND signals and the HCU signals from the hand control unit interface logic H4, the system mode control signals are developed and supplied to the various radar control computer elements as required. In addition, the appropriate radar set control indicator lamps are energized by appropriate status indication STIND signals developed by the RSC interface and radar mode control element.

Also, the RSC interface and mode control element R7 communicates with the radar transmitter and both receives transmitter status signals TXST and supplies a transmitter control signal PRF. A gating signal GTCONT related to the transmitter sequencing is supplied from the element R7 to the DSP controller P7 for synchronization of the DSP with the transmitter.

The line of sight (LOS) command generator and controller S4 generates antenna scan commands to position the radar antenna (the line of sight) in accordance with a predetermined scan pattern or in response to movement of the HCU by the pilot. Both the scan pattern signals and the HCU signals (FAZEL) are coordinated with angle and gimbal limits to prevent excessive scanning rates and to keep the antenna position within set stop limits. The resultant SCAN signals are supplied to a stabilization unit in the antenna command position by way of the interface logic I1, D1. The SCAN signals are then space stabilized and employed to generate the antenna commanded position signals APC as described in the referenced Quesinberry et al patent.

Additional miscellaneous functions performed by the radar control computer may include diagnostic functions, internal timing functions and utility mathematical functions. These functions are provided in the program listing hereinafter and may include:

DIAGNOSTIC FUNCTIONS

C1 To check computer memory (checksum)
D3 To check computer processor
D9 To check input/output and digibus

INTERNAL TIMING

C4 Real time clock

UTILITY MATHEMATICAL FUNCTIONS

D2 To perform double precision multiplication
S6 to perform square root of $x$
Z9 To perform sine and cosine of an angle

PROGRAM LISTING

The program listing provided herein is in assembly language for the Westinghouse Millicomputer and is self-explanatory when viewed in light of the foregoing description. However, to facilitate an understanding of the relationships between the various program routines, reference may be had to FIG. 19 wherein the overall logical flow throughout the computer is illustrated. It should be noted that each of the elements in FIG. 19 is provided with an alphanumeric designation which is expanded in relation to the designations used in FIGS. 3–18. However, the two character designations previously used herein are used in FIG. 19 and in the listing as the first two characters of the corresponding element. Thus, for example, the buffer management and processing executive B3 previously described is labeled in FIG. 10 and listed in the program listing as the B3 BRUINS element.

A program lising suitable for performing the functions described in connection with FIGS. 1–18 on a Westinghouse Millicomputer is set forth in the Appendix A attached hereto on pages A1 through A335.

As previously mentioned, the digital computer utilized is preferably a commercially available millicomputer manufactured and sold by Westinghouse Electric Corporation more than one year prior to the filing of this application such as described in a publication entitled CP-1138 Millicomputer copyrighted in 1972 by Westinghouse Electric Corporation. The millicomputer is relatively simple in that it is constructed of several plug-in modules, which correspond to a central processing unit, an input/output controller, a memory, and a power supply, for example. All of the peripheral devices (functional modules) that are controlled by such computer may be connected separately via the commercially available Digibus, which is manufactured and sold by Westinghouse Electric Corporation more than one year prior to the filing of this application. Such connection is made by Digibus interface units to the millicomputer input/output over a bidirectional eight bit Digibus.

With respect to the input/output, the bus has multiple, identical, interface connectors. Thus, the Digibus organization is independent of peripheral devices. A system in which a peripheral device is unplugged from one bus connector and plugged into another would continue to operate without requiring any changes in either hardware or software.

The millicomputer is the master controller of the Digibus, since all data tranferred in either direction are initiated and monitored by the millicomputer. The millicomputer issues the command and then commands the data transfer.

The Digibus organization permits the millicomputer to take inventory of the peripheral device on the bus. Each device is queried as to its status and characteristics. Once the status and characteristic inventories are prepared, the system may respond in accordance with its peripheral inventory. Peripherals may be added or deleted as required. With respect to addressing and programming, up to sixteen peripheral devices may be controlled by the bus. Each is addressed by a four bit address code. The address code is determined by the peripheral device, not the bus interface connector. This permits the system to be configured without hardware or software changes, even when the configuration is to change to meet certain requirements. When the computer specifies an address, the peripheral device with that address code responds with either an input or output of data. The computer instruction word contains the address of the periphal device selected plus a three bit command code.

To effect an output from the processor on the Digibus, two signals originating in the millicomputer input/output are required. These are COMMAND STROBE and DATA STROBE. First an eight bit command is formed in conjunction with a COMMAND STROBE. Several microseconds later, data appears on the eight bit bus in coordination with a DATA STROBE.

The input instruction in the computer results in two different operations on the bus. First, an eight bit input command is formed in conjunction with a COMMAND STROBE. The command word directs the instruction to one of sixteen different terminal codes. For the bustie unit, the receiver/processor, and the control/interface, these are fixed terminal codes associated with their commands. However, in the case of the transmitter modules, there is no direct assignment of terminal codes to the equipment. Therefore, system commands must be directed to terminals, not to equipment.

Several microseconds after generating the command word, an Enable is activated in the computer and fed via the Digibus to the module being commanded. The Enable signal transfers an eight bit data word from the commanded unit onto the Digibus. Two standard interfaces are used on the Digibus. Where there are very few data registers to control, the DESIGNATOR CODE is used as a direct reference for input or output of up to eight registers the data may be transferred from or to any general purpose register.

Input and output under the DESIGNATOR CODES simply reference various registers at these interfaces. Further, where the interface is a computer to computer interface, these registers are used as either interface flag control or as data buffers for asynchronous interfaces.

For Digibus interfaces where more than eight registers are involved, a different address and scheme is used. In order to provide for flexible control, a sublevel of addressing is used. In each of these data areas (terminal codes), there is a major and a minor address register (eight bits each) for data control. The designator code loads data first into the major address register followed by data for the minor address register. With these two registers directly under Digibus control, sixteen bits of sublevel addressing is possible for subsequent data transfer.

Each data word is assigned a unique major and minor address. The only difference between the two registers is that the minor address can be automatically incremented with data transfers for successive loading of large data blocks.

The basic design of the Digibus system includes the digital interface units which are connected to the eight bit directional Digibus and the peripheral devices. All communications to the computer are through these interface units. These interface units must be capable of responding within the allotted time since the entire Digibus and digital interface system is under millicomputer control.

The basic transfer operation includes the transfer of an eight bit address code to each of the Digibus interface units. Each Digibus unit compares the received address code with the code of the terminal location to which the unit is connected. The peripheral device with the proper code (as compared by the Digibus interface unit) will then receive one of the sub-address command codes. The second part of the transfer is an eight bit data word received either by the peripheral device (output) or sent from the peripheral device (input).

The computer-to-interface signals are connected from the millicomputer input/output to the Digibus interface unit. There are several commands that are utilized — for example, COMMAND STROBE, COMMAND STROBE is used to enter commands from the computer to Digibus interface units. The signal DATA STROBE, DATA STROBE is used to inform the selected units that the data from computer is now on the bus lines. The signal INPUT ENABLE, INPUT ENABLE is used to define the time that the selected unit must have its data on the Digibus lines.

With respect to interface-to-peripheral signals, the following are control signals supplied by the Digibus interface unit to the peripheral device. The signal IN/OUT defines the direction of data flow either to or from the peripheral device. This signal is only valid during an input/output cycle. The signal DATA STROBE OUT is used when data is transferred to the peripheral from the processor to enter data into the peripheral. Data is entered at the trailing edge of the signal. The signal TRANSMIT ENABLE, is used when data is transferred to the computer from the peripheral to indicate that data is being transmitted to the computer. The peripheral device must hold its data constant for the duration of the signal. The signal STANDBY PWR is generated inside the Digibus interface unit by the decoding of a command. When PWR is high, standby power should be "on" in the peripheral unit. The signal VALID LINE defines an input/output cycle. The command the code is associated with the addresses as well as the input/output should only be considered correct during the VALID signal. DIN ONE THROUGH DIN EIGHT are the data lines from the Digibus interface unit to the remainder in the peripheral device. Data is taken from these lines at the clearing edge of the DATA STROBE OUT signal. The lines DOL ONE THROUGH DOL EIGHT are the data lines to the Digibus interface unit from the remainder of the peripheral device. Peripheral device data should be stable on these lines for the duration of the TRANSMIT ENABLE signal. Various terminal codes are specified to provide a unique address to every peripheral Digibus interface unit in the system.

The input/output section of the millicomputer functions as the interface between the common Digibus and the processing section of the computer. The input/output is entirely under program control, where the contents of the registers specified by the field in the input/output instructions are placed onto or read from the Digibus. The input/output of the computer is comprised of conventional tristate line drivers, receivers, counters, and decoders which generate the bus commands and timing signals required by the data bus. In addition to bus interface circuits, the input/output contains circuits to reshape the real time clock overflow signal, logic to perform the memory protect function, and driving circuits to distribute clock signals to the memory and processor boards.

The bus line drivers are conventional tri-state devices, and the receivers are conventional dual differential line units. The line receivers are especially designed to receive differential digital data from the transmission lines. To place information on the bus, line transmitters are switched from their high impedance state to a low impedance state. Line transmitter switching signals are generated by a counter and decoder located on the input/output board. When in the low impedance state, the line transmitters have the ability to receive or supply approximately 40 milliamperes. With the line transmitters enabled, a binary one is on the bus; and when the line transmitters are not enabled, a binary zero is on the bus. With the line transmitter in the high impedance state, the driver leakage current is in the microampere range, thereby allowing many transmitters to be connected to the bus. Because the receivers operate in the differential mode, data transmissions are relatively insensitive to commmon mode noise. The output of the line receivers are applied to the conventional tristate drivers. These drivers are enabled or strobed when information is to be read from the Digibus and transferred to the millicomputer input/output bus. The line transmitters and receivers for each of the eight bits are connected to the Digibus through 30 ohm resistors to minimize standing waves on the bus and to provide an impedance match. Also, at the output of the tri-state line transmitter, are a pair of one kilohm resistors which are used as "pullup" resistors to +5 volts. Using these pullup resistors improves the rise and fall times of the signal on the bus and increases the pulse amplitude. The value of the pullup resistance and the series resistance is a function of the bus length and type, the characteristics of the line transmitters and receivers. In general, these values are selected for each application.

The Digibus is constructed of flexible cable, with a characteristic impedance of approximately 120 ohms. The cable length depends upon the particular application. Sixteen modules (peripheral units) may be connected to the bus. The number of such modules is limited by the format address word rather than any electrical design restriction of the receiver/drivers or bus.

In normal operation, a memory write cycle is inhibited for the first 6124 storage locations of the four memory unit. Memory protection is achieved by determining if any of the three most significant bits of the memory address word are in a "one" state. These three bits are compared in comparator logic. If any one of these bits of the address word is in the "one" state, the memory write cycle is inhibited.

An internal timer is provided in the control of an interface module. This timer is a sixteen bit counter, incremented every 28 microseconds. The counter can be quoted or stored by software commands. An overflow occurring from this computer is an indication that a program is trapped in a loop. A read time clock overflow signal is applied to the input/output board and reshaped and retimed. The resultant signal is transferred to a control unit where it is integrated with past overflows. If the resultant count is above a preset value, automatic shutdown of the system is initiated.

The input/output section will receive a 28 megahertz computer clock signal. This signal is reshaped and retimed by a single shot multivibrator. The multivibrator output is amplified and distributed to the memory and control unit as phase one and phase two clock signals.

What is claimed is:

1. In an aircraft pulsed doppler radar system including a wave energy transmitter and a receiver for detecting the wave energy returned to the receiver by reflection, a digital system, including a programmed digital computer, for processing the returned energy comprising:

means for determining the range from which said return energy is reflected to provide digital range data, and for evaluating the width of said return energy in the time domain;

means for evaluating the amplitude of said return energy, and for designating said return energy as clutter and generating clutter AGC and blanking signals for control of the receiver in response to an evaluated width and amplitude of said return energy above predetermined minimum values;

means for designating said return energy as an altitude line and for tracking said altitude line designated return energy in response to a predetermined number of detections of said return energy at about the same range over a predetermined period of time, said altitude line designating and tracking means having a tracking loop response sufficient to account for changes in terrain beneath the aircraft and for sudden range changes of short duration; and, means for designating said return energy as a target and for tracking said target designated return energy in response to said range determining means, said amplitude determining means and an evaluated width of said return energy below said predetermined value.

2. The system of claim 1 wherein said target designating and tracking means comprises:

means for combining said range and amplitude data for target designated return energy and determining a centroided range for said target designated return energy in response to said combined data;

means for subtracting said centroided range from a preset range value of said target designating and tracking means to generate a range error signal;

means for integrating said range error signal to provide a relative target range rate signal;

means for subtracting aircraft speed from said relative target range rate to provide an absolute target range rate signal;

means for integrating said absolute target range rate signal to provide an absolute target range signal; and, means responsive to said target range signal for correcting said preset range value of said target designating and tracking means in a direction tending to null said range error signal.

3. The system of claim 2 wherein said digital processing system provides digital signals representing the sine and cosine of the lobe on receive only frequency and wherein said target designating and tracking means includes:

means for summing said amplitude data from said amplitude evaluating means over a plurality of range cells and for generating a target AGC level in response to said summed amplitude data;

means for subtracting said AGC level from said summed amplitude data to provide a gain controlled target signal and for normalizing said gain controlled target signal in response to said target AGC level; and, means for multiplying said normalized gain controlled target signal by each of said digital signals representing the sine and cosine of the lobe on receive only frequency to obtain respective target azimuth and elevation tracking errors.

4. The system of claim 3 including means for modifying said return energy by a noise AGC level developed by a noise AGC generating means, wherein said noise AGC level generating means comprises:
- means for sampling receiver noise at each of a plurality of radar PRF's during antenna turnaround;
- means for summing the receiver noise samples and comparing the sum with a threshold value; and,
- a filter having a first order filter characteristic for filtering the resultant signal from said summing and comparing means to thereby provide said AGC level.

5. The system of claim 4 wherein said noise AGC level generating means comprises means for generating said target AGC level when said return energy is designated as a target.

6. The system of claim 2 including buffer storage and control means for storing digital signals representing values of the energy received over a look period related in duration to a predetermined multiple number of interpulse periods of the radar and for selectively supplying said stored digital data signals as return energy indicative signals to said evaluating, determining, and designating and tracking means.

7. The system of claim 6 including:
- a main memory for storing the values of fixed and calculated ones of said digital signals stored by said buffer storage and control means; and,
- means for periodically updating all values in said buffer storage and control means from said main memory in accordance with a predetermined routine without regard to the character of said values.

8. The system of claim 1 including means for modifying said return energy by a noise AGC level developed by a noise AGC generating means, wherein said noise AGC level generating means comprises:
- means for sampling receiver noise at each of a plurality of radar PRF's during antenna turnaround;
- means for summing the receiver noise samples and comparing the sum with a threshold value; and,
- a filter having a first order filter characteristic for filtering the resultant signal from said summing and comparing means to thereby provide said AGC level.

9. The system of claim 8 including buffer storage and control means for storing digital signals representing values of the return energy received over a look period related in duration to a predetermined multiple number of interpulse periods of the radar and for selectively supplying said stored digital data signals as return energy indicative signals to said evaluating, determining and designating and tracking means.

10. The system of claim 1 including buffer storage and control means for storing digital signals representing values of the return energy received over a look period related in duration to a predetermined multiple number of interpulse periods of the radar and for selectively supplying said stored digital data signals as return energy indicative signals to said evaluating, determining, and designating and tracking means.

11. The system of claim 10 including:
- a main memory for storing the values of fixed and calculated ones of said signals stored by said buffer storage and control means; and,
- means for periodically updating all values in said buffer storage and control means from said main memory in accordance with a predetermined routine without regard to the character of said values.

12. A method for processing return energy detected by a wave energy receiver after transmission as pulses of wave energy by a transmitter of a doppler radar system, the method comprising the steps of:
- determining the range from which said return energy is reflected and providing digital range data;
- evaluating the width of said return energy in the time domain;
- evaluating the amplitude of said return energy and providing digital amplitude data;
- designating said return energy as clutter and generating clutter AGC and blanking signals for control of the receiver in response to an evaluated width and amplitude of said return energy above predetermined minimum values; j
- designating said return energy as an altitude line in response to a predetermined number of detections of said return energy at about the same range over a predetermined period of time;
- tracking said altitude line designated return energy with a tracking loop response sufficient to account for changes in terrain beneath the aircraft and for sudden range changes of short duration; and,
- designating said return energy as a target and tracking said target designated return energy in response to said range determining means, said amplitude determining means and an evaluated width of said return energy below said predetermined value.

13. The method of claim 12 wherein said return energy is designated and tracked as a target by:
- combining said range and amplitude data for target designated return energy and determining a centroided range for said target designated return energy in response to said combined data;
- subtracting said centroided range from a preset range value of said target to generate a range error signal;
- integrating said range error signal to provide a relative target range rate signal;
- subtracting aircraft speed from said relative target range rate to provide an absolute target range rate signal;
- integrating said target range rate signal to provide an absolute target range signal; and,
- correcting said preset range value of said target in a direction tending to null said range error signal in response to said target range signal.

14. The method of claim 13 wherein the doppler radar system includes a digital signal processor, the digital signal processor providing digital signals representing the sine and cosine of the lobe on receive only frequency and wherein said target is tracked in azimuth and elevation by:
- summing said digital amplitude data over a plurality of range cells and generating a target AGC level in response to an average of said summed amplitude data;
- subtracting said AGC level from said summed amplitude data to provide a gain controlled target signal;
- normalizing said gain controlled target signal in response to said target AGC level; and,
- multiplying said normalized gain controlled target signal by each of said digital signals representing the sine and cosine of the lobe on receive only frequency to obtain respective target azimuth and elevation tracking errors.

15. The method of claim 14 including the steps of modifying said return energy by a noise AGC level developed by:

sampling receiver noise at each of a plurality of radar PRF's during antenna turnaround;

summing the receiver noise samples and comparing the sum with a threshold value to obtain a difference signal; and, filtering the difference signal in accordance with a first order filter characteristic to thereby provide said AGC level.

16. The method of claim 15 including the steps of storing digital signals representing values of the return energy received over a look period related in duration to a predetermined multiple number of interpulse periods of the radar, and selectively supplying said stored digital data signals for evaluation as return energy indicative signals.

17. The method of claim 12 including the steps of modifying said return energy by a noise AGC level developed by:

sampling receiver noise at each of a plurality of radar PRF's during antenna turnaround;

summing the receiver noise samples and comparing the sum with a threshold value to obtain a difference signal; and, filtering the difference signal in accordance with a first order filter characteristic to thereby provide said AGC level.

18. The method of claim 12 including the steps of storing digital signals representing values of the return energy received over a look period related in duration to a predetermined multiple number of interpulse periods of the radar, and selectively supplying said stored digital data signals for evaluation as return energy indicative signals.

* * * * *